United States Patent
Xiao et al.

(10) Patent No.: US 11,054,987 B1
(45) Date of Patent: Jul. 6, 2021

(54) SIDEBAR INTERACTION METHOD, DEVICE, AND COMPUTER-READABLE STORAGE MEDIUM

(71) Applicant: Shanghai Transsion Co., Ltd., Shanghai (CN)

(72) Inventors: Ming Xiao, Shanghai (CN); Lingzhi Li, Shanghai (CN); Weifeng Lu, Shanghai (CN); Shichao Liu, Shanghai (CN); Wei Xu, Shanghai (CN)

(73) Assignee: Shanghai Transsion Co., Ltd., Shanghai (CN)

( * ) Notice: Subject to any disclaimer, the term of this patent is extended or adjusted under 35 U.S.C. 154(b) by 0 days.

(21) Appl. No.: 16/896,442

(22) Filed: Jun. 9, 2020

(30) Foreign Application Priority Data

| Dec. 25, 2019 | (CN) | 201911358422.5 |
| Dec. 25, 2019 | (CN) | 201911385650.1 |
| Dec. 25, 2019 | (CN) | 201911385849.4 |
| Dec. 25, 2019 | (CN) | 201911385881.2 |

(Continued)

(51) Int. Cl.
| *G06F 3/0488* | (2013.01) |
| *G06F 9/54* | (2006.01) |
| *G06F 3/0482* | (2013.01) |
| *G06F 3/0485* | (2013.01) |

(52) U.S. Cl.
CPC .......... *G06F 3/04883* (2013.01); *G06F 9/542* (2013.01); *G06F 3/0482* (2013.01); *G06F 3/0485* (2013.01)

(58) Field of Classification Search
CPC ............................. G06F 3/04883; G06F 9/542
See application file for complete search history.

(56) References Cited

U.S. PATENT DOCUMENTS

| 2005/0050462 A1* | 3/2005 | Whittle | G06F 3/0481 715/247 |
| 2009/0094395 A1* | 4/2009 | Shen | G06F 3/023 710/74 |

(Continued)

OTHER PUBLICATIONS

Extended European Search Report in counterpart European Patent Application No. 20178449.3, dated Dec. 21, 2020.

*Primary Examiner* — Seth A Silverman
(74) *Attorney, Agent, or Firm* — Westbridge IP LLC

(57) ABSTRACT

Disclosed are a sidebar interaction method, a device and a computer readable storage medium. The method includes: receiving an instruction to initiate an interaction, generating an interaction module on a currently operating interface of a front-end application, outputting at least one notification message in the interaction module; initiating a back-end application, displaying a sidebar in a first target display area on the currently operating interface; and detecting a preset operation corresponding to the sidebar and responding to the preset operation. The sidebar interaction module is arranged, and notification message interception is carried out through the sidebar interaction module, so that the interference is reduced when different applications or different functions of the same application interact. The sidebar interaction is more reasonable. The sidebar for auxiliary application is displayed on the operating interface, improving the perception a user's perception to a third-party program corresponding to the auxiliary function.

29 Claims, 9 Drawing Sheets

(30) Foreign Application Priority Data

Dec. 25, 2019 (CN) .......................... 201911385886.5
Dec. 25, 2019 (CN) .......................... 201911385888.4

(56) References Cited

U.S. PATENT DOCUMENTS

2012/0144331 A1* 6/2012 Tolonen ................ G06F 3/0486
　　　　　　　　　　　　　　　　　　　　715/769
2012/0278725 A1* 11/2012 Gordon ............ H04N 21/25891
　　　　　　　　　　　　　　　　　　　　715/738
2014/0089833 A1* 3/2014 Hwang ................ G06F 3/0488
　　　　　　　　　　　　　　　　　　　　715/769
2014/0351748 A1   11/2014 Xia et al.

* cited by examiner

SIDEBAR INTERACTION METHOD, DEVICE, AND COMPUTER-READABLE STORAGE MEDIUM

CROSS REFERENCE TO RELATED APPLICATION

The present disclosure claims the priorities of Chinese Application No. 201911385650.1, filed Dec. 25, 2019, Chinese Application No. 201911385881.2, filed Dec. 25, 2019, Chinese Application No. 201911385849.4, filed Dec. 25, 2019, Chinese Application No. 201911358422.5, filed Dec. 25, 2019, Chinese Application No. 201911385888.4, filed Dec. 25, 2019, and Chinese Application No. 201911385886.5, filed Dec. 25, 2019, the entire contents of which are hereby incorporated by reference.

TECHNICAL FIELD

The present disclosure relates to the field of sidebar interaction, in particular to a sidebar interaction method, a device, and a computer readable storage medium.

BACKGROUND

Development in computer intelligence has stimulated both of number of applications and functions of a single application.

Despite the convenience this rapid growth brings to users, some defects are still unsolved including that: when multiple applications are installed in the terminal, and are simultaneously operating, some of the applications interfere with each other. For example, a sudden phone call will interfere and interrupts a video call applied in an instant communication application (e.g., WeChat) by the users. In addition, functions may interfere with each other within a single application. For example, receiving a mail may interfere the video call in the videoing process by a user.

Further, applications skyrockets in their types and numbers with prosperity of intelligent terminals. If multiple applications are simultaneously displayed on the display interface of the intelligent terminals, for example, both of the web browser and video streaming are simultaneously displayed, etc., the sidebars cannot be displayed normally due to the inconsistent functions required by each application. Obviously, in regard to the display of the sidebars, the related intelligent terminals are not smart enough to adapt to more complex application scenario. Further, when a user initiates an application of the terminal device, a sidebar will be displayed on the operating interface of the application. And the sidebar includes various shortcut buttons such as buttons for function and/or buttons for application. However, at present, the method of editing the sidebar of the terminal device is relatively fixed with a relatively low flexibility.

SUMMARY

The present disclosure is to provide a sidebar interaction method, a device and a computer readable storage medium, aiming at to solve the interference as well as imperfect sidebar display and interaction when different applications interferes with each other or different functions interferes within a same application.

In order to achieve the above object, the present disclosure provides a sidebar interaction method, including:

receiving an instruction to initiate a sidebar interaction, generating an interaction module on a currently operating interface of a front-end application, and outputting a notification message in the interaction module;

initiating a back-end application, and displaying a sidebar in a target display area on the currently operating interface;

detecting a preset operation corresponding to the sidebar and responding to the preset operation.

In some embodiment, the method includes: receiving the instruction to initiate the sidebar interaction, and generating an interaction module on the currently operating interface of the front-end application;

receiving a notification message, and adding the notification message into the interaction module;

receiving an instruction to check the notification message, and outputting the notification message from the interaction module.

In some embodiment, the method includes: receiving the instruction to check the notification message, and in response to a determination that the interaction module includes at least two notification messages, judging whether all the notification messages are originated from the front-end application;

in response to that all the notification messages are originated from the front-end application, alternately displaying the notification messages;

in response to that at least one of the notification messages is not originated from the front-end application, adding an identifier regarding a source application of the notification message onto the at least one of the notification messages, and outputting the notification messages.

In some embodiment, the method includes: in response to receiving an instruction to add a first function of a first application, outputting a first function set of the front-end application and adding the first function from the first function set to the interaction module;

in response to receiving an instruction to delete a second function of a second application, outputting a second function set already existed in the interaction module, and deleting the second function from the second function set in the interaction module; or in response to receiving an instruction to switch to a third function of a third application, outputting functions stored in the interaction module;

acquiring the third function from the output functions, and switching the currently operating interface to an interface corresponding to the third function of the third application.

In some embodiment, the method includes: outputting a floating window associated with the interaction module, and outputting the notification message to the floating window for a user to view and/or reply to the notification message;

in response to the notification message being in a text format, converting the text format into a voice format for output;

acquiring a quantity of the notification messages, and outputting and displaying the notification message in a banner in response to a determination that the quantity is more than a preset threshold value.

In some embodiment, the method includes: acquiring usage information corresponding to the currently operating interface;

determining a blank area based on a display content on the currently operating interface, and determining the first target display area based on the blank display area and the usage information;

displaying a sidebar corresponding to the usage information in the first target display area.

In some embodiment, the method includes: in response to the blank display area having a first display area with an area greater than an area required for the usage information in the blank display area, taking the first display area as the first target display area; and in response to the blank display area not having the first display area with an area greater than an area required for the usage information in the blank display area, determining a second display area with a largest area in the blank display area;

determining a target function icon on the sidebar based on the second display area;

displaying the target function icon in the first target display area.

In some embodiment, the method includes: determining the first target display area based on a position connecting the first display interface and the second display interface;

determining the first target display area based on display contents of the first display interface and/or the second display interface;

determining the first target display area based on usage information of the first display interface and/or the second display interface.

In some embodiment, the method includes: determining a number of function icons displayed in the second display area based on an area of the second display area;

determining the display quantity and/or the position of the target function icon, based on the display quantity of the function icon, the application corresponding to the display interface and the application to which each function icon in the usage information belongs;

determining the display quantity and/or the position of the target function icons based on the display contents of the first display interface and/or the second display interface;

determining the display quantity and/or the position of the target function icons based on the usage information of the first display interface and/or the second display interface;

In some embodiment, the method includes: in response to a determination that the unread messages of the application corresponding to the display interface is detected and a number of the unread messages is no less than a preset value, determining whether a sub-function icon corresponding to the unread messages exists in the sidebar;

In response to sub-function icon corresponding to the unread messages being existed in the sidebar, displaying the sub-function icon.

In some embodiment, the method includes: in response to a movement operation triggered by the sidebar being detected, acquiring a touch endpoint corresponding to the movement operation;

displaying the sidebar in a display area corresponding to the touch endpoint.

In some embodiment, the method includes: in response to a horizontal display interface being switched to and detected, determining a second target display area according to the usage information;

displaying the sidebar in the second target display area.

In some embodiment, the method includes: in response to at least two application displays being detected, determining whether the applications meet preset conditions;

in response to the preset conditions being met, displaying a sidebar corresponding to the usage information in the first target display area.

In some embodiment, the method includes: determining whether the applications are consistent in category attribute, and if yes, determining that the applications meet the preset conditions;

determining whether the display contents of the applications are consistent in format, and if yes, determining that the applications meet the preset conditions;

determining whether a number of currently displayed applications to be no more than a preset value, and if yes, determining that the applications meet the preset conditions;

determining an area of the display interface of the applications to be larger than a preset area, and if yes, determining that the applications meet preset conditions;

determining a position on the display interface of the applications to meet a preset position, and if yes, determining that the applications meet preset conditions.

In some embodiment, the method includes: determining a first category attribute of each of the applications, and if a number of attributes with a same category is no more than a preset threshold, determining that the sidebar meets the condition;

determining a display content of each of the applications, and if the display content fails to be in a same format, determining that the sidebar meets the condition;

determining a first number of the applications currently displayed, and if the first number is more than a preset number, determining that the sidebar meets the condition;

determining an area of display interfaces of the applications, and if the area is no more than a preset value, determining that the sidebar meets the condition;

determining positions of display interfaces of the applications, and if the positions fail to be in a preset layout, determining that the sidebar meets the condition;

determining a second category attribute of non-operating applications, and if the second attribute in categories of the non-operating applications are consistent, determining that the sidebar meets the condition;

determining that a layout of the non-operating applications meets a preset layout, and if so, determining that the sidebar meets the condition;

determining a second number of the non-operating applications, and if a proportion of the second number to the first number meets a preset value, determining that the sidebar meets the condition.

In some embodiment, the method includes: in response to an execution instruction regarding the sidebar being detected, determining a target application corresponding to the execution instruction, wherein the target application comprises one or more applications;

executing a function corresponding to the execution instruction, regarding the target application.

In some embodiment, the method includes: in response to a switching instruction regarding the applications being detected, switching and displaying a target application corresponding to the switching instruction, and adjusting the sidebar based on the target application.

In some embodiment, the method includes: in response to the preset conditions being met, determining a displaying mode to display the sidebar;

displaying the sidebar according to the displaying mode;

in response to at least two applications are displayed, adjusting a function item of the sidebar and/or the display position of the sidebar based on the applications.

In some embodiment, the method includes: detecting a preset touch operation regarding the sidebar and displaying the sidebar, wherein the sidebar comprises at least one of: a setting button, a shortcut button for function and/or a shortcut button for application.

In some embodiment, the method includes: detecting a first preset touch operation regarding the setting button, displaying a sidebar editing center, wherein the sidebar editing center comprises an editing center of the shortcut button for function and/or an editing center of the shortcut button for application;

editing the sidebar based on a touch operation regarding the sidebar editing center;

detecting a second preset touch operation regarding the shortcut button, displaying a shortcut editing center for the shortcut button for function and/or a shortcut editing center for the shortcut button for application;

editing the sidebar based on a touch operation regarding the shortcut editing center for the shortcut button for function;

In some embodiment, the method includes: in response to an instruction to initiate the video call being detected, displaying an interface of the video call, and displaying a sidebar for auxiliary application on the interface of the video call.

In some embodiment, the method includes: hiding the sidebar for auxiliary application and displaying the at least one auxiliary program icon on the interface of the video call;

executing a touch operation on the auxiliary program icon and responding to the touch operation.

In some embodiment, the method includes: judging whether touch operation regarding an button for auxiliary function is detected;

in response to touch operation corresponding to the button for auxiliary function being detected, increasing a color depth of the button for auxiliary function, and/or reducing transparency of the button for auxiliary function;

in response to the touch operation corresponding to the button for auxiliary function failed to be detected, reducing a color depth and/or a display area of the button for auxiliary function, and/or increasing transparency of the button for auxiliary function, and/or moving the button for auxiliary function to a sidebar and hiding the button for auxiliary function.

In some embodiment, the method includes: in response to an instruction being detected to close the video call, closing the interface of the video call;

switching off the auxiliary function and hiding the button for auxiliary function.

In some embodiment, the method includes: in response to a message sending request being received during a video call, acquiring a corresponding message type and a current layout information;

determining a target layout information according to the message type and the current layout information;

displaying a message input window according to the target layout information, and adjusting a video call window and/or the sidebar of the video call.

In some embodiment, the method includes: acquiring a message to be sent, in response to an input of the message being complete;

hiding the message input window, restoring a current layout of the video call window and/or the sidebar of the video call to a layout before the adjustment, and displaying the message to be sent in the sidebar of the video call;

and/or in response to a message sending instruction, sending the message to be sent and restoring the sidebar of the video call to a normal state;

and/or in response to a change information of a display layout of the mobile terminal being detected, correspondingly adjusting the display layout of the mobile terminal according to the change information;

and/or in response to a function operation instruction triggered based on the sidebar of the video call being received, determining a function operating interface according to the function operation instruction, and superposing and displaying the function operating interface and the message input window.

In some embodiment, the method includes: acquiring a number of calling parties in the video call and acquiring a current display state of the mobile terminal;

determining a corresponding display mode according to the number of calling parties and the current display state;

displaying the video call window and the sidebar of the video call according to the display mode.

In some embodiment, the method includes: in response to the screen of the mobile terminal being horizontally placed and displayed, and a left display area of the video call window is larger than a right display area, displaying a message input window in the left display area according to the target layout information; and/or, in response to the screen of the mobile terminal being horizontally placed and displayed, and a left display area of the video call window is smaller than a right display area, displaying a message input window in the right display area according to the target layout information.

In some embodiment, the method includes: in response to the screen of the mobile terminal being horizontally placed and displayed, and the mobile terminal is held by a left hand of a user, displaying a message input window in the right display area according to the target layout information;

in response to the screen of the mobile terminal being horizontally placed and displayed, and the mobile terminal is held by a right hand of a user, displaying a message input window in the left display area according to the target layout information;

in response to the screen of the mobile terminal being horizontally placed and displayed, and the mobile terminal is held by both left and right hands of a user, displaying a message input window in the left display area or the right display area according to the target layout information.

Additionally, the present disclosure further provides a sidebar interaction device, in which the device includes a processor, and a memory storing one or more programs including instructions that, when executed by the processor, cause the device to perform the operations as described above.

In addition, the present disclosure further provides a computer readable storage medium, in which the medium includes a processor, and a memory storing one or more programs including instructions that, when executed by the processor, cause the device to perform the operations as described above.

The embodiments of the present disclosure provide a sidebar interaction method, a device and a computer readable storage medium. The method specifically includes: receiving an instruction to initiate a sidebar interaction, generating an interaction module on a currently operating interface of a front-end application, and outputting a notification message in the interaction module; initiating a back-end application, and displaying a sidebar in a target display area on the currently operating interface; and detecting a preset operation corresponding to the sidebar and responding to the preset operation. According to the present disclosure, the notification message is intercepted by the interaction module, so that the interference between different applications or different functions of the same application interact has been reduced. The interaction regarding the sidebar is more reasonable. And the sidebar for auxiliary application is displayed on the operating interface, improving the perception of a user to a third-party program corresponding to the auxiliary function.

BRIEF DESCRIPTION OF THE DRAWINGS

The accompanying drawings, which are incorporated in and constitute a part of this specification, illustrate embodiments consistent with the present disclosure and together with the description serve to explain the principles of the present disclosure.

In order to explain the embodiment of the present disclosure or the technical solution of the prior art more clearly, the following will briefly introduce the drawings necessary in the description of the embodiments or the prior art. Obviously, for those ordinary skill in the art, other drawings can be acquired according to the structure shown in these drawings without any creative effort.

The implementation, functional features and advantages of the present application will be further described with reference to the accompanying drawings with the embodiments.

DETAILED DESCRIPTION OF THE EMBODIMENTS

It should be understood that the specific embodiments described herein are only for the purpose of explaining the present disclosure and are not intended to limit the present disclosure.

In the following description, suffixes such as "module", "component" or "unit" used to denote elements are only used to facilitate the description of the present application and have no specific meaning in themselves. Therefore, "module", "component" and "unit" can be used interchangeably.

The interaction device involved in the embodiment of the sidebar interaction method (also called terminal, device or terminal device) of the present disclosure can be a PC, a smart phone, a tablet computer, an electronic-reader, an MP3 (Moving Picture Experts Group Audio Layer III), an MP4 (moving picture experts group audio layer iv) or a portable computer.

Figure 1:
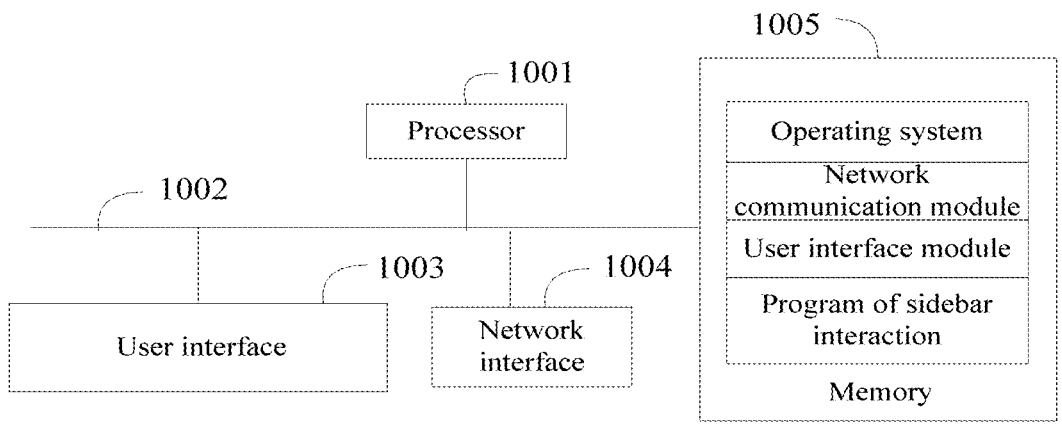
FIG. 1 is a schematic view of a hardware structure of a sidebar interactive device according to an embodiment of the present disclosure.

As shown in FIG. 1, the terminal may include a processor 1001, such as a CPU, a network interface 1004, a user interface 1003, a memory 1005, and a communication bus 1002. In which, the communication bus 1002 is configured to implement connection and communication between these components. The user interface 1003 may include a display, an input unit such as a keyboard, and the optional user interface 1003 may further include a standard wired interface and a wireless interface. The network interface 1004 may optionally include a standard wired interface and a wireless interface (such as a WI-FI interface). The memory 1005 may be a high-speed RAM memory or a non-volatile memory such as a disk memory. The memory 1005 may alternatively be a storage device independent of the aforementioned processor 1001.

In some embodiment, the controller may further include a camera, a radio frequency circuit, a sensor, an audio circuit, a Wi-Fi module, and the like. Sensors may include light sensors, motion sensors and other sensors. Specifically, the light sensor may include an ambient light sensor and a proximity sensor. The ambient light sensor may acquire light and shade data of ambient light, and the proximity sensor may acquire the distance between the mobile terminal and the object. As a motion sensor, the gravity acceleration sensor can detect the magnitude of acceleration in all directions (generally in three dimensions) and the magnitude and direction of gravity at still. It can be configured to identify the postures of the motion terminal (including horizontal and vertical screen switching, related games, magnetometer posture calibration), vibration identification related functions (including pedometer, tapping), etc. The mobile terminal can definitely further be equipped with other sensors including gyroscopes, barometers, hygrometers, thermometers, infrared sensors and the like, which will not be detailed herein.

It would be understood by those skilled in the art that the terminal shown in FIG. 1 does not constitute a limitation to the terminal, which may include more or fewer components than shown, or some components may be combined, or different components arranged.

As shown in FIG. 1, the memory 1005 as a computer storage medium may include an operating system, a network communication module, a user interface module, and a program for sidebar interactions.

In the terminals shown in FIG. 1, the network interface 1004 is mainly configured to connect with a back-end server and perform data communication with the back-end server. The user interface 1003 is mainly configured to connect the client end (user end) and perform data communication with the client end; while the processor 1001 can be configured to call the program of in the memory 1005 and execute the following operations:

receiving an instruction to initiate a sidebar interaction, generating an sidebar interaction module on a currently operating interface of a front-end application, and outputting a notification message in the sidebar interaction module;

initiating a back-end application, and displaying a sidebar in a target display area on the currently operating interface;

detecting a preset operation corresponding to the sidebar and responding to the preset operation.

Further, the processor 1001 may call the program stored in the memory 1005, and also execute the following operations:

receiving the instruction to initiate the sidebar interaction, and generating an sidebar interaction module on the currently operating interface of the front-end application;

receiving a notification message, and adding the notification message into the sidebar interaction module;

receiving an instruction to check the notification message, and outputting the notification message from the sidebar interaction module.

Further, the processor 1001 may call the program stored in the memory 1005, and also execute the following operations:

receiving the instruction to check the notification message, and in response to a determination that the sidebar interaction module includes at least two notification messages, judging whether all the notification messages are originated from the front-end application;

in response to that all the notification messages are originated from the front-end application, alternately displaying the notification messages;

in response to that at least one of the notification messages is not originated from the front-end application, adding an identifier regarding a source application of the notification message onto the at least one of the notification messages, and outputting the notification messages.

Further, the processor 1001 may call the program stored in the memory 1005, and also execute the following operations:

in response to receiving an instruction to add a first function of a first application, outputting a first function set of the front-end application and adding the first function from the first function set to the sidebar interaction module;

in response to receiving an instruction to delete a second function of a second application, outputting a second function set already existed in the sidebar interaction module, and deleting the second function from the second function set in the sidebar interaction module; or in response to receiving an instruction to switch to a third function of a third application, outputting functions stored in the sidebar interaction module;

acquiring the third function from the output functions, and switching the currently operating interface to an interface corresponding to the third function of the third application.

Further, the processor 1001 may call the program stored in the memory 1005, and also execute the following operations:

outputting a floating window associated with the sidebar interaction module, and outputting the notification message to the floating window for a user to view and/or reply to the notification message;

in response to the notification message being in a text format, converting the text format into a voice format for output;

acquiring a quantity of the notification messages, and outputting and displaying the notification message in a banner in response to a determination that the quantity is more than a preset threshold value.

Further, the processor 1001 may call the program stored in the memory 1005, and also execute the following operations:

acquiring usage information corresponding to the currently operating interface;

determining a blank area based on a display content on the currently operating interface, and determining the first target display area based on the blank display area and the usage information;

displaying a sidebar corresponding to the usage information in the first target display area.

Further, the processor 1001 may call the program stored in the memory 1005, and also execute the following operations:

in response to the blank display area having a first display area with an area greater than an area required for the usage information in the blank display area, taking the first display area as the first target display area; and in response to the blank display area not having the first display area with an area greater than an area required for the usage information in the blank display area, determining a second display area with a largest area in the blank display area;

determining a target function icon on the sidebar based on the second display area;

displaying the target function icon in the first target display area.

Further, the processor 1001 may call the program stored in the memory 1005, and also execute the following operations:

determining the first target display area based on a position connecting the first display area and the second display area;

determining the first target display area based on display contents of the first display interface and/or the second display interface;

determining the first target display area based on usage information of the first display interface and/or the second display interface.

Further, the processor 1001 may call the program stored in the memory 1005, and also execute the following operations:

determining a number of function icons displayed in the second display area based on an area of the second display area;

determining the display quantity and/or the position of the target function icon, based on the display quantity of the function icon, the application corresponding to the display interface and the application to which each function icon in the usage information belongs;

determining the display quantity and/or the position of the target function icons based on the display contents of the first display interface and/or the second display interface;

determining the display quantity and/or the position of the target function icons based on the usage information of the first display interface and/or the second display interface;

Further, the processor 1001 may call the program stored in the memory 1005, and also execute the following operations:

in response to a determination that the unread messages of the application corresponding to the display interface is detected and a number of the unread messages is no less than a preset value, determining whether a sub-function icon corresponding to the unread messages exists in the sidebar;

In response to sub-function icon corresponding to the unread messages being existed in the sidebar, displaying the sub-function icon.

In some embodiment, the processor 1001 may execute: in response to a movement operation triggered by the sidebar being detected, acquiring a touch endpoint corresponding to the movement operation;

displaying the sidebar in a display area corresponding to the touch endpoint.

Further, the processor 1001 may call the program stored in the memory 1005, and also execute the following operations:

in response to a horizontal display interface being switched to and detected, determining a second target display area according to the usage information;

displaying the sidebar in the second target display area.

Further, the processor 1001 may call the program stored in the memory 1005, and also execute the following operations:

in response to at least two application displays being detected, determining whether the applications meet preset conditions;

in response to the preset conditions being met, displaying a sidebar corresponding to the usage information in the first target display area.

Further, the processor 1001 may call the program stored in the memory 1005, and also execute the following operations:

determining whether the applications are consistent in category attribute, and if yes, determining that the applications meet the preset conditions;

determining whether the display contents of the applications are consistent in format, and if yes, determining that the applications meet the preset conditions;

determining whether a number of currently displayed applications to be no more than a preset value, and if yes, determining that the applications meet the preset conditions;

determining an area of the display interface of the applications to be larger than a preset area, and if yes, determining that the applications meet preset conditions;

determining a position on the display interface of the applications to meet a preset position, and if yes, determining that the applications meet preset conditions.

Further, the processor 1001 may call the program stored in the memory 1005, and also execute the following operations:

determining a first category attribute of each of the applications, and if a number of attributes with a same category is no more than a preset threshold, determining that the sidebar meets the condition;

determining a display content of each of the applications, and if the display content fails to be in a same format, determining that the sidebar meets the condition;

determining a first number of the applications currently displayed, and if the first number is more than a preset number, determining that the sidebar meets the condition;

determining an area of display interfaces of the applications, and if the area is no more than a preset value, determining that the sidebar meets the condition;

determining positions of display interfaces of the applications, and if the positions fail to be in a preset layout, determining that the sidebar meets the condition;

determining a second category attribute of non-operating applications, and if the second category attributes of the non-operating applications are consistent, determining that the sidebar meets the condition;

determining that a layout of the non-operating applications meets a preset layout, and if so, determining that the sidebar meets the condition;

determining a second number of the non-operating applications, and if a proportion of the second number to the first number meets a preset value, determining that the sidebar meets the condition.

Further, the processor 1001 may call the program stored in the memory 1005, and also execute the following operations:

in response to an execution instruction regarding the sidebar being detected, determining a target application corresponding to the execution instruction, wherein the target application comprises one or more applications;

executing a function corresponding to the execution instruction, regarding the target application.

In some embodiment, the processor 1001 may execute: in response to a switching instruction regarding the applications being detected, switching and displaying a target application corresponding to the switching instruction, and adjusting the sidebar based on the target application.

Further, the processor 1001 may call the program stored in the memory 1005, and also execute the following operations:

in response to the preset conditions being met, determining a displaying mode to display the sidebar;

displaying the sidebar according to the displaying mode;

in response to at least two applications are displayed, adjusting a function item of the sidebar and/or the display position of the sidebar based on the applications.

Further, the processor 1001 may call the program stored in the memory 1005, and also execute the following operations:

detecting a preset touch operation regarding the sidebar and displaying the sidebar, wherein the sidebar comprises at least one of: a setting button, a shortcut button for function and/or a shortcut button for application.

Further, the processor 1001 may call the program stored in the memory 1005, and also execute the following operations:

detecting a first preset touch operation regarding the setting button, displaying a sidebar editing center, wherein the sidebar editing center comprises an editing center of the shortcut button for function and/or an editing center of the shortcut button for application;

editing the sidebar based on a touch operation regarding the sidebar editing center;

detecting a second preset touch operation regarding the shortcut button, displaying a shortcut editing center for the shortcut button for function and/or a shortcut editing center for the shortcut button for application;

editing the sidebar based on a touch operation regarding the shortcut editing center for the shortcut button for function;

Further, the processor 1001 may call the program stored in the memory 1005, and also execute the following operations:

in response to an instruction to initiate the video call being detected, displaying an interface of the video call, and displaying a sidebar for auxiliary application on the interface of the video call.

Further, the processor 1001 may call the program stored in the memory 1005, and also execute the following operations:

hiding the sidebar for auxiliary application and displaying the at least one auxiliary program icon on the interface of the video call;

executing a touch operation on the auxiliary program icon and responding to the touch operation.

Further, the processor 1001 may call the program stored in the memory 1005, and also execute the following operations:

judging whether touch operation regarding an button for auxiliary function is detected;

in response to touch operation corresponding to the button for auxiliary function being detected, increasing a color depth of the button for auxiliary function, and/or reducing transparency of the button for auxiliary function;

in response to the touch operation corresponding to the button for auxiliary function failed to be detected, reducing a color depth and/or a display area of the button for auxiliary function, and/or increasing transparency of the button for auxiliary function, and/or moving the button for auxiliary function to a sidebar and hiding the button for auxiliary function.

Further, the processor 1001 may call the program stored in the memory 1005, and also execute the following operations:

in response to an instruction being detected to close the video call, closing the interface of the video call;

switching off the auxiliary function and hiding the button for auxiliary function.

Further, the processor 1001 may call the program stored in the memory 1005, and also execute the following operations:

in response to a message sending request being received during a video call, acquiring a corresponding message type and a current layout information;

determining a target layout information according to the message type and the current layout information;

displaying a message input window according to the target layout information, and adjusting a video call window and/or the sidebar of the video call.

Further, the processor 1001 may call the program stored in the memory 1005, and also execute the following operations:

acquiring a message to be sent, in response to an input of the message being complete;

hiding the message input window, restoring a current layout of the video call window and/or the sidebar of the video call to a layout before the adjustment, and displaying the message to be sent in the sidebar of the video call;

and/or in response to a message sending instruction, sending the message to be sent and restoring the sidebar of the video call to a normal state;

and/or in response to a change information of a display layout of the mobile terminal being detected, correspondingly adjusting the display layout of the mobile terminal according to the change information;

and/or in response to a function operation instruction triggered based on the sidebar of the video call being received, determining a function operating interface according to the function operation instruction, and superposing and displaying the function operating interface and the message input window.

Further, the processor 1001 may call the program stored in the memory 1005, and also execute the following operations:

acquiring a number of calling parties in the video call and acquiring a current display state of the mobile terminal;

determining a corresponding display mode according to the number of calling parties and the current display state;

displaying the video call window and the sidebar of the video call according to the display mode.

Further, the processor 1001 may call the program stored in the memory 1005, and also execute the following operations:

in response to the screen of the mobile terminal being horizontally placed and displayed, and a left display area of the video call window is larger than a right display area, displaying a message input window in the left display area according to the target layout information; and/or, in response to the screen of the mobile terminal being horizontally placed and displayed, and a left display area of the video call window is smaller than a right display area, displaying a message input window in the right display area according to the target layout information.

Further, the processor 1001 may call the program stored in the memory 1005, and also execute the following operations:

in response to the screen of the mobile terminal being horizontally placed and displayed, and the mobile terminal is held by a left hand of a user, displaying a message input window in the right display area according to the target layout information;

in response to the screen of the mobile terminal being horizontally placed and displayed, and the mobile terminal is held by a right hand of a user, displaying a message input window in the left display area according to the target layout information;

in response to the screen of the mobile terminal being horizontally placed and displayed, and the mobile terminal is held by both left and right hands of a user, displaying a message input window in the left display area or the right display area according to the target layout information.

Figure 2:
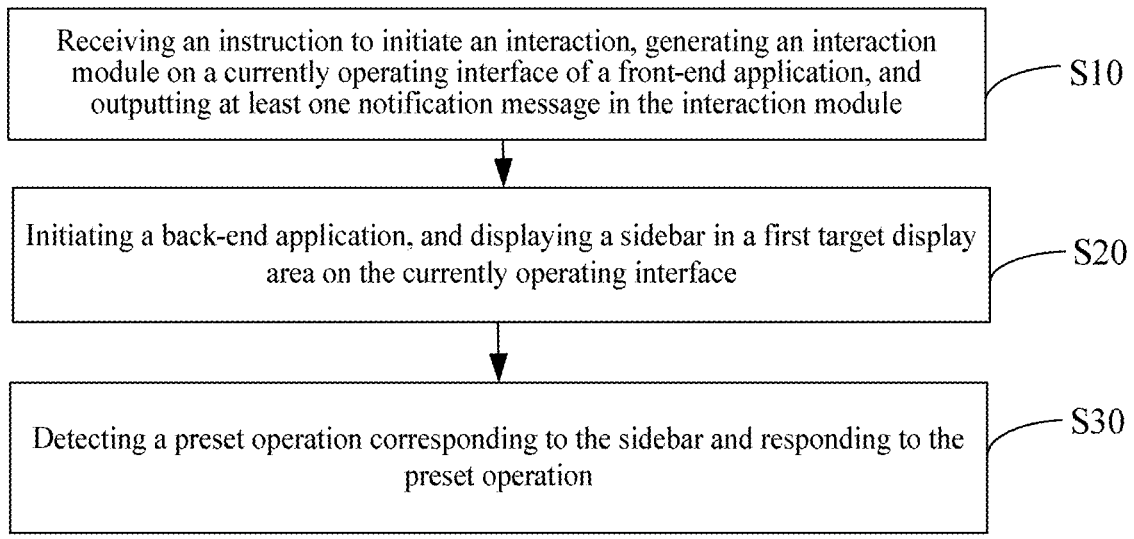
FIG. 2 is a flow chart of a sidebar interaction method according to a first embodiment of the present disclosure.

The present disclosure may further provide a sidebar interaction method, and FIG. 2 is referred to, which is a flow chart of the sidebar interaction method according to the first embodiment of the present disclosure.

In this example, the sidebar interaction method includes:

Operations S10, receiving an instruction to initiate a sidebar interaction, generating an sidebar interaction module on a currently operating interface of a front-end application, and outputting a notification message in the sidebar interaction module;

The sidebar interaction method in present embodiment is applied to multi-function interaction devices, and the types of multi-function interaction devices are not specifically limited herein. That is, the multi-function interaction devices can be terminal devices with display functions such as smart phones, tablet computers, e-readers, portable computers, etc.

In some embodiments, the terminal receives the instruction to initiate the sidebar interaction, and the triggering mode of the instruction to initiate the sidebar interaction is not specifically limited. That is, the instruction to initiate the sidebar interaction may be triggered by the user actively or automatically by the terminal. Specifically, the triggering mode of the instruction to initiate the sidebar interaction includes:

example 1: instruction triggered by voice or motion, that is, the terminal monitors voice and/or motion. If the voice and/or motion is monitored to be a preset trigger voice (the preset trigger voice can be a voice as "interactive function on") and/or a preset trigger motion (the preset trigger motion can be an motion such as three-finger sliding screen, long press, etc.), the terminal initiates an instruction for the interactive function according to the voice and/or motion.

example 2: the display interface of the front-end application is preset with an start-up key (the shape of the start-up key is not limited herein), the touch operation received on the start-up key (the touch operation can be a click, a long press or a slide), the terminal acquires the touch operation received from the start-up key, and the terminal triggers an instruction to initiate the sidebar interaction according to the touch operation.

The sidebar interaction module is generated on a currently operating interface of a front-end application, and a notification message is output in the sidebar interaction module. In which, the sidebar interaction module is configured to implement interactions of different functions. Namely, the sidebar interaction module can realize interaction of different functions of the front-end application. Further, the sidebar interaction module may be configured to implement interaction of functions between the front-end applications and the back-end application. For example, the sidebar interaction module can block message and notify message.

Specifically, operation S10 includes:

Operation S101, receiving the instruction to initiate the sidebar interaction, and generating an sidebar interaction module on the currently operating interface of the front-end application;

Operation S102, receiving a notification message, and adding the notification message into the sidebar interaction module;

Operation S103, receiving an instruction to check the notification message, and outputting the notification message from the sidebar interaction module.

Specifically, the sidebar interaction module is generated on a currently operating interface of a front-end application after the instruction to initiate a sidebar interaction is received by the sidebar interaction module, and a notification message is output in the sidebar interaction module. In which, the sidebar interaction module is configured to implement interactions of different functions. Namely, the sidebar interaction module can realize interaction of different functions of the front-end application. Further, the sidebar interaction module may be configured to implement interaction of functions between the front-end applications and the back-end application. For example, the sidebar interaction module can block message and notify message.

Figure 3:
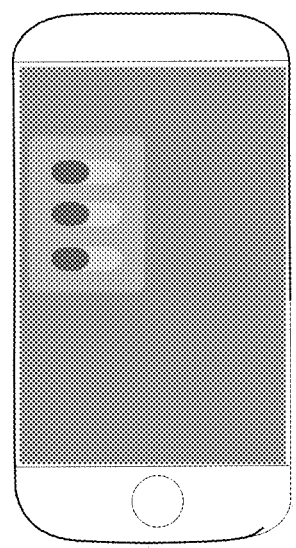
FIG. 3 is a schematic view showing a specific detail of the sidebar interaction method according to the first embodiment of the present disclosure.

In addition, referring to FIG. 3, the sidebar interaction module can also block a certain sub-function of the front-end application or add a certain sub-function to the front-end application. For example, the front-end application is instant communication application. When the sidebar interaction module includes a function to block calls coming to the terminal, the sidebar interaction module can block call messages sent in the instant communication application; or the sidebar interaction module includes a message prompting function, the sidebar interaction module can prompt some important messages sent through the instant communication application.

Further, the operation of outputting the notification message in the sidebar interaction module includes at least one of the following:

outputting a floating window associated with the sidebar interaction module, and outputting the notification message to the floating window for a user to view and/or reply to the notification message;

in response to the notification message being in a text format, converting the text format into a voice format for output;

acquiring a quantity of the notification messages, and outputting and displaying the notification message in a banner in response to a determination that the quantity is more than a preset threshold value.

For appreciation, several detailed examples are provided for the sidebar interaction module to implement different function interactions, including:

example 1: the sidebar interaction module integrates the first function, the second function and the third function. When the front-end application currently displays a first page, and the user clicks a identifier regarding the third function in the sidebar interaction module, the sidebar interaction module enables a shift from the first page to the third page. In the present example, the interaction is achieved of different functions within the front-end application (one application) by the sidebar interaction module, and the user can skip the original path to the target page set by the front-end application. The operation is rather user-friendly.

example 2: the sidebar interaction module sets up a message interception. For example, the sidebar interaction module may set up a phone interception. When the terminal is currently on the video chat interface of instant communication application (such as WeChat), and the phone comes in, the video chat in the terminal will not be terminated directly. The sidebar interaction module can intercept the phone and send a prompt information in the area corresponding to the sidebar interaction module on the video interface.

It should be appreciated that the sidebar interaction module can self-adjustable regarding its display based on the time it has been displayed, for example to a semi-transparent module or fully transparent one. In addition, after the front-end application exits or switches to the background, the sidebar interaction module can hide according to the state of the front-end application.

In the embodiments described above, the sidebar interaction module is generated on the currently operating interface of the front-end application, so that different applications or different function interactions of the same application are able to interacted, enabling the sidebar interaction more reasonable.

When the terminal detects a notification message, the terminal may intercept the notification message, and adds the intercepted notification message to the sidebar interaction module. Specifically, the method includes:

Step a1, when a notification message is detected, judging whether a target operating interface of the notification message is the currently operating interface;

Step a2, if the target operating interface of the notification message is not the currently operating interface, intercepting the notification message and adding the notification message to the sidebar interaction module.

When the terminal detects the notification message, the terminal judges whether the notification message originates from the front-end application, and if the notification message does not originate from the front-end application, the terminal intercepts the notification message and adds the notification message to the sidebar interaction module. If the notification message originates from the front-end application, the terminal acquires the target operating interface of the notification message, and the terminal judges whether the target operating interface of the notification message is the currently operating interface. If the target operating interface of the notification message is the currently operating interface, the notification message is displayed; If the target operating interface of the notification message is not the currently operating interface, the terminal intercepts the notification message and adds the notification message to the sidebar interaction module.

In the embodiment described above, the message is intercepted by the sidebar interaction module, to prevent the message from being directly sent to the currently operating interface of the front-end application and interfering with the currently operating interface.

In addition, it should be appreciated that when the terminal generates an sidebar interaction module, the sidebar interaction module itself will be displayed on the currently operating interface, causing interference to the user. Therefore, in the present embodiment, if the terminal does not detect a notification message in a preset time period (the preset time period can be set specifically. For example, the preset time period can be set as 2 minutes). The terminal may adjust the visibility of the sidebar interaction module, for example, the terminal may adjust the sidebar interaction module into transparent or translucent. In some embodiment, when the terminal detects that the sidebar interaction module is not in use, the terminal adjusts the display state of the sidebar interaction module to reduce the attention of the user and make the sidebar interactive method more intelligent.

When the terminal receives the check-up instruction, the triggering mode of the check-up instruction is not specifically limited, for example, the user may click on the sidebar interaction module to trigger the check-up instruction. And when the terminal receives the check-up instruction, the terminal may output a notification message in the sidebar interaction module for the user to check up; Specifically, it includes:

Operation b1: receiving an instruction to check the notification message, and acquiring the notification message from the sidebar interaction module.

Operation b2: hide the sidebar interaction module, and displaying the notification message in the display area of the sidebar interaction module.

Figure 4:
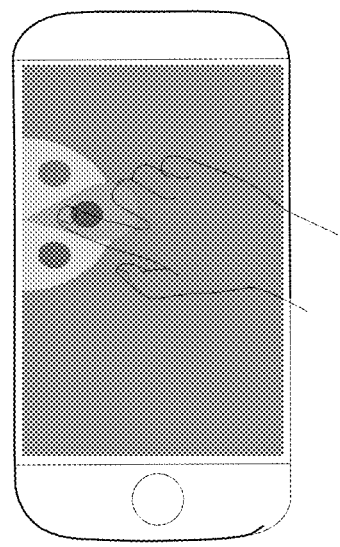
FIG. 4 is a schematic view showing a specific detail of an interaction module of the sidebar interaction method according to the first embodiment of the present disclosure.
Figure 5:
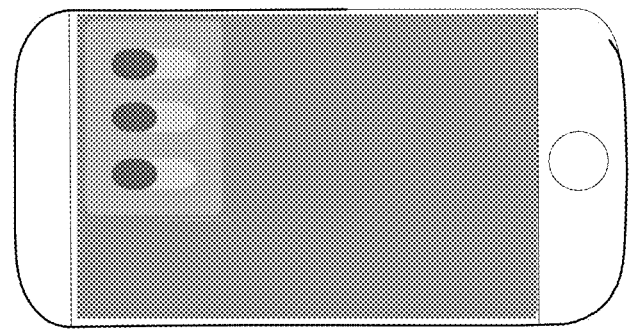
FIG. 5 is a schematic view showing another specific detail of the sidebar interaction method according to the first embodiment of the present disclosure.

The terminal receives a check-up instruction, and the terminal acquires a notification message in the sidebar interaction module. The terminal hides the sidebar interaction module and displays a notification message at the display area of the sidebar interaction module. FIG. 4 shows that the front-end application is an instant messaging application and the sidebar interaction module is semi-circular. In the present embodiment, the notification message is displayed at the sidebar interaction module within the semi-circular area, avoiding interfering with normal video calls.

In the embodiments described above, the terminal receives an instruction to initiate the sidebar interaction and generates an sidebar interaction module on the currently operating interface of the front-end application; receiving a notification message and adding the notification message to the sidebar interaction module; receiving a check-up instruction and outputting the notification message in the sidebar interaction module. The sidebar interaction module provided in the embodiments described above, may intercept the notification message through the sidebar interaction module, so as to stop the notification message from interfering with the current process of the front-end application. The occurrence of interference is reduced when different applications or the same application interact with different functions, and the sidebar interaction is more reasonable.

Operation S20, initiating a back-end application, and displaying a sidebar in a target display area on the currently operating interface;

After the back-end application is initiated, the current display interface of the terminal is the display interface of the application. For example, if a confirmation instruction corresponding to the video call request is received after the video call request is checked, the terminal establishes a video call connection according to the confirmation instruction, displays the display interface corresponding to the video call, and acquires the usage information corresponding to the current display interface of the terminal. It should be appreciated that if the terminal currently displays the display interfaces of other applications when the application is initiated, the terminal can split the screen for individual display. One split-screen is used to display the display interfaces of other applications, and the other split-screen is used to display the display interfaces of the initiated application. Alternatively, the display screen of the terminal is a foldable screen or a flexible screen. The current screen can be divided into at least two display areas by folding or other operations, and the display interfaces of other applications are displayed in one display area, and the display interfaces of the initiated applications are displayed in another display area.

It should be appreciated that the usage information includes at least one of the following: the usage direction of the terminal; the number and/or attributes of application operated by the terminal; or the content of the currently operating application. In other embodiments, the usage information may also be a shortcut icon of the terminal operating application and/or a preset shortcut icon of the terminal.

After the usage information is determined, a target display area is determined according to the usage information, that is, the target display area corresponding to the usage information is determined according to the display interface, so that the displayed sidebar does not affect the display content on the display interface. For example, the target display area corresponding to the usage information is determined according to the content currently displayed on the display interface.

Figure 6:
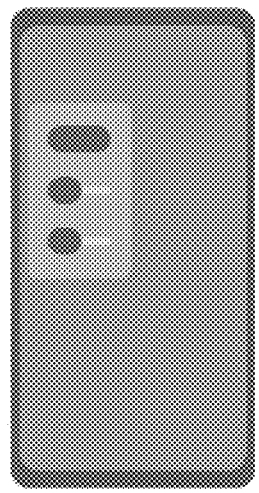
FIG. 6 is a schematic view showing a specific detail of a sidebar according to the first embodiment of the present disclosure.
Figure 7:
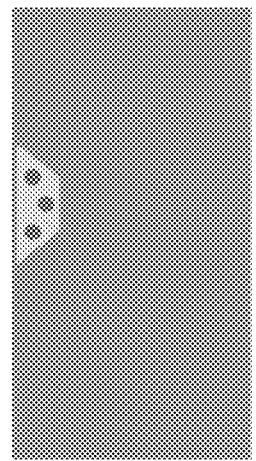
FIG. 7 is a schematic view showing another specific detail of a sidebar according to the first embodiment of the present disclosure.

Referring to FIGS. 6 and 7, after the target display area is determined, a sidebar corresponding to the usage information is displayed on the target display area, so that a user can perform corresponding operations to the sidebar, and the sidebar does not affect the content display in the display interface, thereby improving the user experience.

Further, when a change is detected in the display content of the display interface, a second target display area corresponding to the usage information is determined according to the changed display content, and a sidebar is displayed in the second target display area.

In the present embodiment, if the display content of the display interface changes, the sidebar may affect the display of the changed display content, so a second target display area is newly determined to prevent the sidebar from interfering the display of the changed display content and further improve the user experience.

Further, the number of target function icons displayed in the sidebar is based on at least one of the following:

the area of the second display area with the largest area in the blank display area;

the number of icons corresponding to the usage information;

the priority of each function icon corresponding to the usage information.

Operation S30, detecting a preset operation corresponding to the sidebar and responding to the preset operation.

The terminal device monitors in real-time the operation information corresponding to the operating interface of the functional application, and responds to the preset operation if the preset operation information is detected. The preset touch operation may include voice, motions, buttons and the like, that is, if the preset voice information is detected, or the preset motion is detected, or the preset touch operation corresponding to the button of the functional application is detected, the preset operation is responded. Specifically, the terminal device in real-time monitors the touch operation corresponding to the display screen. If a touch operation is detected, the touch parameter of the touch operation is acquired, and whether the touch parameter meets a preset condition is detected. If the touch parameter meets the preset condition, a response matched with the touch operation is acquired, and the response is output and displayed. If the touch parameter does not meet the preset condition, optionally, a vibration is feedback and output to prompt the user of such touch operation error.

Optionally, the terminal device collects user motions based on the front camera/rear camera of the terminal device in real time, and detects whether the user motions meet preset conditions; if so, a response matched with the motions is acquired, and the response is output and displayed. Optionally, the terminal device monitors whether voice information is received in real time, and recognizes whether the voice information is preset voice information if the voice information is received. Then terminal acquires a response matched with the preset voice information if the voice information is preset voice information, and outputs and displays the response.

In the embodiment described above, the user monitors the voice information of the user in real time in the entire process of initiating and using the application. If the preset voice information is detected, the shortcut function and/or shortcut application matched with the preset voice information is acquired. Specifically, once the voice information is acquired, the voice information may be converted into text information, and the feature word corresponding to the text information is extracted. It is then detected whether the feature word is a preset feature word. If the feature word is preset, a shortcut function and/or a shortcut application may be acquired and initiated that matched with the preset characteristic word. A shortcut button for function and/or a button for shortcut application may be displayed corresponding to the shortcut function. For example, if the voice input "I want to beautify image" is detected, the characteristic word extracted from this voice information may be "beautify". Then, if it is detected that the shortcut function and/or the shortcut application matched by the characteristic word "beauty" is a function with beautification and/or an application with beautification function. The function with beautification and/or the application with beautification function may then be initiated, and a function with beautification button and/or a application with beautification function button corresponding to the function with beautification and/or the application with beautification function may be displayed. It should be appreciated that in the process of operating a function of an application, the terminal device monitors the user's motion in real time, and if a preset motion is detected, the terminal may acquire a shortcut function and/or a shortcut application matched with the preset motion, then initiates the shortcut function and/or the shortcut application, and displays a shortcut button for function and/or a button for shortcut application corresponding to the shortcut function.

Specifically, operation S30 includes,

Operation S301, detecting a preset touch operation regarding the sidebar and displaying the sidebar, wherein the sidebar comprises at least one of: a setting button, a shortcut button for function and/or a shortcut button for application.

Figure 8:
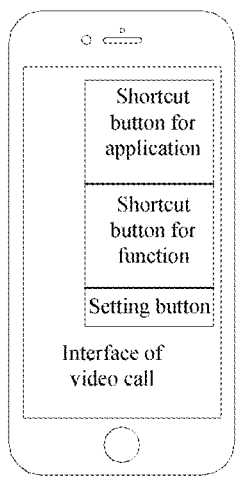
FIG. 8 is a schematic view of showing a detail of a shortcut key in the sidebar interaction method according to the first embodiment of the present disclosure.

If a preset touch operation corresponding to the sidebar is detected, the sidebar is displayed. The preset touch operation comprises voice, motions, buttons and the like, that is, if preset voice information is detected, or preset motions are detected, or preset touch operation corresponding to a button of a function application is detected, specifically, if clicking or pressing the touch operation corresponding to the sidebar is detected, the sidebar is popped up and displayed. The sidebar comprises a setting button, a shortcut button for function and/or a button for shortcut application. Further, the sidebar includes a function button of the application. The buttons of the operating-on application can be displayed in the sidebar to replace the original display, thereby leaving the display interface with a bigger area for the operating-on application. Optionally, the layout of the set button, the shortcut button for function and/or the button for shortcut application within the framework of the sidebar can be referred to FIG. 8 which is a detailed schematic view of an embodiment of the present disclosure. As can be seen in FIG. 8, the sidebar is rectangular, and is divided into three main partitions, including an area for shortcut button for function, an area for button for shortcut application and an area for set button. These areas are layout vertically in a sequence. Optionally, the shortcut button for function area may display one priority shortcut button for function; the button for shortcut application area may display one priority button for shortcut application. Further, the user can slide the currently displayed shortcut button to hide other shortcut buttons displayed by the currently displayed shortcut button. For example, if the shortcut application included in the sidebar includes a beauty button for shortcut application, a WeChat button for shortcut application, etc., and the priority display shortcut application of the current sidebar includes a beauty button for shortcut application. If the sliding is detected on beauty button for shortcut application, the beauty shortcut button is hidden and the WeChat button for shortcut application is displayed.

Figure 9:
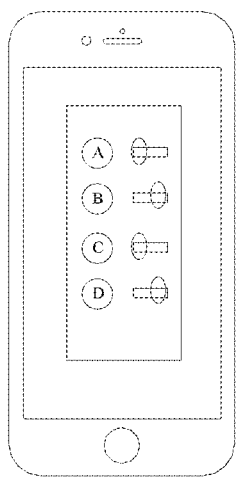
FIG. 9 is a schematic view of showing a detail of an editing center according to the first embodiment of the present disclosure.

It should be appreciated that if a first preset touch operation corresponding to the setting button is detected, an editing center is displayed. Optionally, the first preset touch operation can be flexibly set, for example, if a click or a press touch operation corresponding to the setting button is detected, a sidebar editing center is displayed. As shown in a detailed schematic view in FIG. 9 includes an editing center regarding the shortcut button for function and/or a editing center regarding the shortcut button for application. In FIG. 9, the editing center for the shortcut button for function includes a switch button on the right side of each shortcut button for function. The switch button may enable the user to control the display of the shortcut button for function in the sidebar and/or the shortcut function switch state, corresponding to the shortcut button for function. Specifically, for example, the four shortcut functions are displayed in the editing center for the shortcut button for function shown in FIG. 9, The four shortcut functions include the shortcut function A, the shortcut function B, the shortcut function C and the shortcut function D. The switch button corresponding to the shortcut function A is on, the switch button corresponding to the shortcut function B is off, the switch button corresponding to the shortcut function C is on, the switch button corresponding to the shortcut function D is off. This may indicate that shortcut functions A and C can be enabled based on the respective shortcut button for function A and the respective shortcut button for function C in the sidebar.

Figure 10:
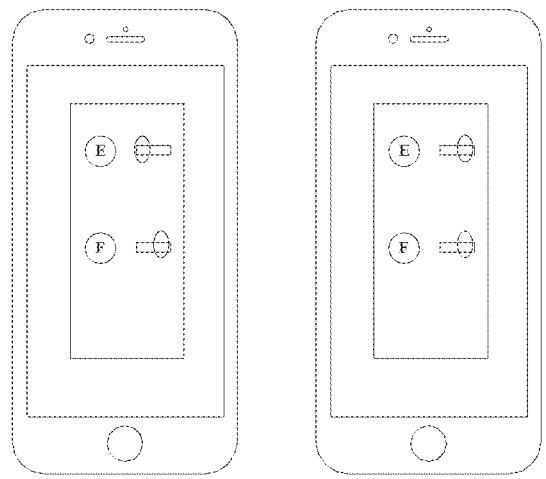
FIG. 10 is a schematic view of showing another detail of an editing center according to the first embodiment of the present disclosure.

Further, after operation S301, the interaction method further includes,

Operation S302, detecting a first preset touch operation regarding the setting button, displaying a sidebar editing center, wherein the sidebar editing center comprises an editing center of the shortcut button for function and/or an editing center of the shortcut button for application;

Operation S303, editing the sidebar based on a touch operation regarding the sidebar editing center;

Operations S304, detecting a second preset touch operation regarding the shortcut button, displaying a shortcut editing center for the shortcut button for function and/or a shortcut editing center for the shortcut button for application;

Operation S305, editing the sidebar based on a touch operation regarding the shortcut editing center for the shortcut button for function;

In the above steps, it should be appreciated that, if a second preset touch operation corresponding to the shortcut button for function is detected, the shortcut button for function and/or the editing center for the shortcut button for application is displayed. The editing of the sidebar can be displayed beside the sidebar and at least partially overlaps with the sidebar, and the display icon of the sidebar changes to the edit state. The second preset touch operation can be flexibly set, for example, if a click corresponding to the shortcut button for function is detected, the editing center for the shortcut button for function can be displayed. Specifically, as shown in a detailed schematic view in FIG. 10, the editing center includes an editing center of the shortcut button for function. A switch button is on the right side of each shortcut button for function. The switch button enables the user to control the display of the shortcut button for function in the sidebar and/or the switch corresponding to the shortcut button for function. As shown in the sub-figure at the left in FIG. 10, the shortcut button editing center includes shortcut function E and shortcut function F. As shown in the sub-figure at the left of FIG. 10, the switch button at the right of shortcut function E is on and the switch button at the right of shortcut function F is off before the user edits. If it is detected that the user clicks the switch button corresponding to shortcut function E, the switch button at the right of shortcut function E is turned to be off, as shown in the sub-figure at the right in FIG. 10.

Further, it should be appreciated that, if a third preset touch operation corresponding to the button for shortcut application is detected, the editing center for the shortcut button for application can be displayed. The third preset touch operation can be flexibly set, for example, if a click corresponding to the button for shortcut application is detected, the editing center for the shortcut button for application is displayed.

Once an instruction to confirm the editing operation is detected, the sidebar editing center and/or the editing center for the shortcut button for function and/or the editing center for the shortcut button for application can be hidden, and the sidebar can be displayed corresponding a new sidebar following the confirmed editing operation. This sidebar may include a setting button, a shortcut button for function corresponding to the editing confirmation instruction and/or a button for shortcut application. It should be appreciated that, for example, after the sidebar editing center edits the shortcut button for function and/or the button for shortcut application. Specifically, for example, before editing, if the switch button at the right of the shortcut function G is ON and the switch button at the right of the shortcut function H is OFF. The corresponding sidebar includes the button corresponding to the shortcut function G, if it is detected that the user clicks the switch button corresponding to the shortcut function H, the switch button at the right of the E shortcut function is ON. After the editing instruction is confirmed, the sidebar editing center, and/or the editing center for the shortcut button for function, and/or the editing center for the shortcut button for application is hidden, i.e. the sidebar editing center, and/or the editing center for the shortcut button for function, and/or the editing center for the shortcut button for application is exited. The sidebar corresponding to the confirmed editing instruction is then displayed. The sidebar corresponding to the confirmed editing instruction includes the button corresponding to the shortcut function G and the button corresponding to the shortcut function H.

The embodiments of the present disclosure provide a sidebar interaction method. The method specifically includes: receiving an instruction to initiate a sidebar interaction, generating an sidebar interaction module on a currently operating interface of a front-end application, and outputting a notification message in the sidebar interaction module; initiating a back-end application, and displaying a sidebar in a target display area on the currently operating interface; and detecting a preset operation corresponding to the sidebar and responding to the preset operation. According to the present disclosure, the notification message is intercepted by the sidebar interaction module, so that the interference between different applications or different functions of the same application interact has been reduced. The interaction regarding the sidebar is more reasonable. And the sidebar for auxiliary application is displayed on the operating interface, improving the perception of a user to a third-party program corresponding to the auxiliary function.

Further, based on the above embodiment of the present disclosure, a second series of embodiments showing the sidebar interaction method of the present disclosure are proposed.

The embodiments are refinement of operation S103 in the first series of embodiments. The difference between the present embodiment and the embodiments above lies in that:

Operation S1031, receiving the instruction to check the notification message, and in response to a determination that the sidebar interaction module includes at least two notification messages, judging whether all the notification messages are originated from the front-end application;

Operation S1032 in response to that all the notification messages are originated from the front-end application, alternately displaying the notification messages;

Operation S1033, in response to that at least one of the notification messages is not originated from the front-end application, adding an identifier regarding a source application of the notification message onto the at least one of the notification messages, and outputting the notification messages.

The terminal receives a check-up instruction, and acquires the number of notification messages from the sidebar interaction module, and outputs the notification messages if the sidebar interaction module includes one notification message, and judges whether the notification messages all originate from the front-end application if the sidebar interaction module includes at least two notification messages. If the notification messages all originate from the front-end application, the terminal will alternately display the notification messages. If there is a notification message that does not originate from the front-end application, the terminal determines the application from which the notification message originated and acquires the application identifier of the application. The terminal adds the application identifier of the source application to the notification message and outputs the notification message.

In the present embodiment, the terminal determines the display mode of the notification message according to the number of notification messages in the sidebar interaction module as well as the source of the notification message, so as to enables the user to view the notification message and quickly trace back the source of the notification message. When necessary, the terminal can switch to the source application to further implement quick switch between different applications by using the sidebar interaction module.

It should be appreciated that the terminal receives the check-up instruction, and outputs the floating window associated with the sidebar interaction module, and outputs the notification message to the floating window for the user to check-up and/or reply to the notification message. That is, with the floating window associated with the sidebar interaction module, the user can check-up and reply to messages, enabling the multi-function interactive display to be more intelligent.

In the present embodiment, after the terminal adds the notification message to the sidebar interaction module, at least one of the following is superimposed and displayed on the currently operating interface: identifier of unread notification message, content preview, and floating window. The messages can be output in a sequence, which is users-friendly and convenient for the user to browse.

The notification message is typically a text, and in some cases, it is inconvenient for the user to check it up. Therefore, when the notification message is in text format, the terminal may convert the notification message into a voice format and outputs the voice. Thus, even if the user is inconvenient to view the notification message, the terminal can use the sidebar interaction module to convert and output the notification message.

Figure 11:
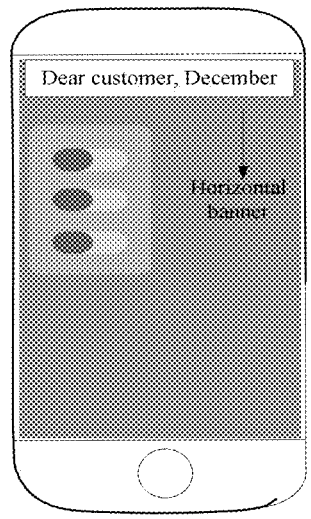
FIG. 11 is a schematic view showing a specific detail of a sidebar interaction method according to a second embodiment of the present disclosure.

In addition, after the notification message is output, it may further include: adjusting the position and/or size of the notification message in the sidebar interaction module when a directional change of the currently displayed page is detected. Referring to FIG. 11, the display interface of the terminal can rotate, and the terminal can adjust the position and/or size of the notification message in the sidebar interaction module according to the rotation, which provides convenience to the users.

The operation of outputting the notification message in the sidebar interaction module when the information amount of the notification message is large, includes: acquiring the message amount of the notification message, and when the message amount exceeds a preset message amount threshold (the preset message amount threshold refers to a preset message amount threshold, for example, the preset message amount threshold is set to 30 characters), outputting and displaying the notification message in the form of banner notification as shown in FIG. 11. Areas can be saved by reducing the occupation of the notification message, and the normal display is ensured.

Further, operation S10 is followed by at least one of the following steps:

Operation S1001, in response to receiving an instruction to add a first function of a first application, outputting a first function set of the front-end application and adding the first function from the first function set to the sidebar interaction module;

Operation S1002, in response to receiving an instruction to delete a second function of a second application, outputting a second function set already existed in the sidebar interaction module, and deleting the second function from the second function set in the sidebar interaction module; or Operation S1003, in response to receiving an instruction to switch to a third function of a third application, outputting functions stored in the sidebar interaction module;

Operation S1004, acquiring the third function from the output functions, and switching the currently operating interface to an interface corresponding to the third function of the third application.

In the present embodiment, the terminal receives an instruction to add a function, the terminal acquires a first function set of the front-end application (the first function set includes various application functions of the front-end application, for example, if the front-end application is WeChat, the application functions may include voice, videoing, message sending, etc.). The terminal outputs the first function set of the front-end application, and the user selects the application function to be added to the sidebar interaction module based on the first function set. The terminal adds the application function selected by the user into the sidebar interaction module.

When the terminal receives the instruction to delete a function, the terminal acquires the added second function set in the sidebar interaction module. The terminal outputs the added second function set in the sidebar interaction module, the user selects the application function to be deleted from the sidebar interaction module based on the second function set, and the terminal deletes the application function selected by the user from the sidebar interaction module.

In the embodiments described above, the user may edit the sidebar interaction module, and may add a function to the sidebar interaction module or delete a function. The sidebar interaction module is improved in catering to the user.

When the terminal receives the instruction to switch to a function, the terminal outputs the specific application function associated with the sidebar interaction module. The application function in present embodiment can be either the application function of the front-end application or the application function of the back-end application. The user selects the target application function to be switched, and the terminal switches the currently displayed interface to a interface corresponding to the target application function according to the selected target application function.

In the embodiment described above, the user selects the target application function based on the sidebar interaction module, and the terminal may switch to an interface according to the target application function. If the target application function selected by the user is a front-end application, a quick switch between functions with a same application may be implement. If the target application function selected by the user is a back-end application, a fast switch of different applications may be implemented, providing more convenience to the users.

Further, after operation S10, the method may further include:

Step S1005, when an instruction to switch applications is received, hiding the sidebar interaction module and switching the front-end application to the back-end operation;

Step S1006, when an instruction to exit an application is received, deleting the sidebar interaction module and exiting the front-end application.

The terminal receives the instruction to switch applications, and the triggering instruction to switch applications is not specifically limited. For example, the user clicks the home key of the terminal to trigger the instruction to switch applications. When the terminal receives the instruction to switch applications, the terminal hides the sidebar interaction module and moves the front-end application to the back-end. When the terminal receives the application exit instruction, the terminal deletes the sidebar interaction module and exits the front-end application.

In the embodiment described above, the terminal may automatically adjust and organize the sidebar interaction module according to the state of the front-end application.

Based on the hardware structure of the sidebar interaction device, a series of embodiments of the sidebar interaction method based on the instant messaging application are proposed as follows.

Figure 12:
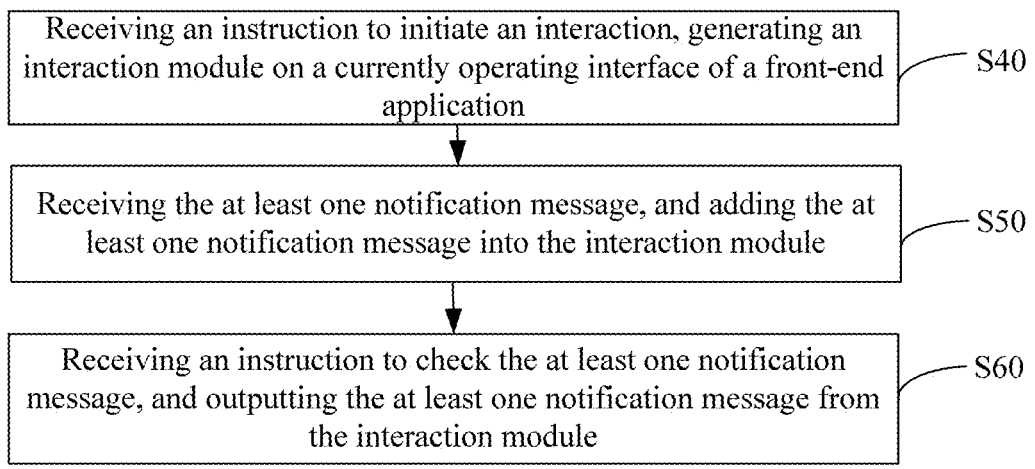
FIG. 12 is a flow chart of a sidebar interaction method according to a third embodiment of the present disclosure.

Referring to FIG. 12, a third embodiment of sidebar interaction method is presented based on an instant messaging application. The method includes:

Operation S40, receiving the instruction to initiate the sidebar interaction, and generating a sidebar interaction module on the currently operating interface of the instant messaging application.

After the terminal receives the instruction to initiate the sidebar interaction, the terminal will use the instant messaging application (the type of instant messaging application is not specifically limited, for example, the instant messaging application can be Tencent WeChat, Tencent QQ, Ali Dingding or WhatsApp which is an application used by iPhone, Android, Windows Phone, WhatsApp Messenger, Symbian and Blackberry Blackberry users for communication between smartphones. WhatsApp uses push notification service. Information sent by relatives, friends and colleagues can be received instantly, and the WhatsApp can be used instead of sending messages of mobile phones for free to send and receive information, pictures, audio files and video information). Interactive function modules are generated on the currently operating interface. The sidebar interaction modules are used for realizing interaction of different functions, namely, the sidebar interaction modules can enables different functions of front-end applications to interact, and the sidebar interaction modules can also realize interaction of functions between different applications of front-end applications and back-end applications. For example, the sidebar interaction module can block message and notify message.

Operation S50, receiving a notification message, and adding the notification message into the sidebar interaction module;

Specifically, operation S50 includes:

judging whether the currently displayed interface is a video or voice chat page when a notification message is detected;

if the currently displayed page is a video or voice chat page, the notification message is intercepted and added to the sidebar interaction module.

In the embodiment described above, when the terminal detects the notification message, the terminal judges whether the currently displayed interface in the instant messaging application is a video or voice chat page. If the currently displayed interface is a video or voice chat page, the terminal may intercept a notification message and add the notification message to the sidebar interaction module. If that currently displayed interface regarding the instant messaging application is not a video or voice chat page, the terminal may judge whether the notification message originates from the instant messaging application. And if the notification message is originated from the instant communication application, the terminal displays the notification message. If the notification message is originated from the instant communication application, the terminal may intercept the notification message and add the notification message to the sidebar interaction module.

Operation S60, receiving an instruction to check the notification message, and outputting the notification message from the sidebar interaction module.

When the terminal receives the check-up instruction, the triggering mode of the check-up instruction is not specifically limited, for example, the user may click on the sidebar interaction module to trigger the check-up instruction. And when the terminal receives the check-up instruction, the terminal may output a notification message in the sidebar interaction module for the user to check up; Specifically, it includes:

receiving the instruction to check the notification message, and in response to a determination that the sidebar interaction module contains at least two notification messages, judging whether all the notification messages are originated from the instant messaging application;

in response to that all the notification messages are originated from the instant messaging application, alternately displaying the notification messages;

in response to that at least one of the notification messages is not originated from the instant messaging application, adding an identifier regarding a source application of the notification message onto the at least one of the notification messages, and outputting the notification messages.

The sidebar interaction module provided in the embodiments described above, may intercept the notification message through the sidebar interaction module, so as to stop the notification message from interfering with the current process of the instant messaging application. The occurrence of interference is reduced when different applications or the same application interact with different functions, and the sidebar interaction is more reasonable.

In addition, it should be appreciated that, after operation S60, the method may further include:

in response to receiving an instruction to add a first function of a first application, outputting a first function set of the instant messaging application and adding the first function from the first function set to the sidebar interaction module;

in response to receiving an instruction to delete a second function of a second application, outputting a second function set already existed in the sidebar interaction module, and deleting the second function from the second function set in the sidebar interaction module; or In the embodiments described above, the user may edit the sidebar interaction module, and may add a function to the sidebar interaction module or delete a function. The sidebar interaction module is improved in catering to the user with the framework of instant messaging application.

Further, based on the above embodiment of the present disclosure, a fourth series of embodiments showing the sidebar interaction method of the present disclosure are proposed.

The embodiments are refinement of operation S20 in the first series of embodiments. The difference between the present embodiment and the embodiments above lies in that:

Operation S201, acquiring usage information corresponding to the currently operating interface;

Operation S202, determining a blank area based on a display content on the currently operating interface, and determining the first target display area based on the blank display area and the usage information;

Operation S230, displaying a sidebar corresponding to the usage information in the first target display area.

In the present embodiment, FIGS. 6 and 7 are referred. After usage information is determined and the current display content of the display interface is acquired, it is determined that whether there has a blank display area on the display interface according to the display content. For example, regarding a video call interface, the display content is a display interface including a person (face) image. If there are some other display areas except for the person image in the display interface, these other display areas can be seen as blank display areas. The blank display area may include a plurality of unrelated display areas. As for file processing applications, if the display interface includes other display areas except for the text information, these other display areas can be seen as the blank display areas.

If there has a blank display area in the display interface, the target display area is determined based on the blank display area and the usage information. Specifically, if there is one blank display area, the blank display area is the target display area, and if there are multiple blank display areas, the target display area is determined according to the usage information.

Specifically, operation S202 includes:

Operation S2021, in response to the blank display area having a first display area with an area greater than an area required for the usage information in the blank display area, taking the first display area as the first target display area; and Operation S2022, in response to the blank display area not having the first display area with an area greater than an area required for the usage information in the blank display area, determining a second display area with a largest area in the blank display area;

Operation S2023, determining a target function icon on the sidebar based on the second display area;

Operation S2024, displaying the target function icon in the first target display area.

In some embodiment, FIGS. 6 and 7 are referred to. If there has a plurality of blank display areas, and when the blank display area includes a first display area having an area larger than the required area corresponding to the usage information, the first display area can be taken as the target display area. It should be appreciated that if there are several areas which meets the requirement of the first display area, a largest display area among the first display areas can be taken as the target display area.

If there is no first display area in the blank display area, that is, the sidebar cannot be completely displayed through one blank display area in such condition, then the second display area with the largest area in the blank display area can be determined. The target function icon in the usage information is then determined based on the second display area. For example, the target function icon is determined according to the priority of the function icon in the usage information. The target function icon is displayed in the target display area, so as to display a part of the sidebar and prevent the sidebar from interfering the information display of the display interface.

Further, operation S2023 includes:

Operation a, determining the number of icons corresponding to the target function icons based on the area of the second display area;

Operation b, determining the target function icon based on the number of icons and the priority of each function icon corresponding to the usage information.

In some embodiment, the number of icons is firstly determined corresponding to the target function icons according to the area of the second display area as well as the display area of a single function icon in the usage information. Then the priority is acquired of each function icon in the usage information, and the target function icon is determined based on the number of icons and the priority. Specifically, the function icons are sequenced and sorted according to the priority, and the function icon with the highest priority in the sorted function icons is taken as the target function icon.

Further, it should be appreciated that the blank display area may include a plurality of blank display areas. If the first display area does not exist in the blank display area, that is, the sidebar cannot be completely displayed through one blank display area, the third display area and the fourth display area are determined if a sum of the areas in the blank display area is greater than that of the area required for display. For example, the sum of the areas of the first two blank display areas with the largest areas is calculated, and if the sum of the areas is greater than the area required, the blank display areas with the largest first two areas are the third display area and the fourth display area.

Then, based on the display area of the third display area and the display area of a single function icon in the usage information, the number of function icons that can be displayed in the third display area is determined, the first target function icon is determined according to this number. And the second target function icon can be determined based on the first target function icon and the usage information, i.e., other function icons other than the first target function icon in the function icon corresponding to the usage information are taken as second target function icons. And finally the first target function icon can be displayed in the third display area and the second target function icon can be displayed in the fourth display area.

In the embodiment described above, if the first display area is not available in the blank display area, the third display area and the fourth display area, the sum of which have an areas in the blank display area larger than the required area for display. A first target function icon is then determined based on the third display area and the usage information, and a second target function icon is determined based on the first target function icon and the usage information. The first target function icon is displayed in the third display area and the second target function icon is displayed in the fourth display area. A part of function icons of the sidebar can be respectively displayed in the third display area and the fourth display area, prevent the sidebar from interfering the other information displayed on the display interface and further improve the user experience.

Based on the fourth embodiment, a fifth embodiment of the present disclosure is proposed. Referring to FIG. 6, in the present embodiment, the display screen of the terminal is a foldable screen, and the display interface includes a first display interface and a second display interface formed by the foldable screen, or the display interface of the terminal has a screen which can be split to form a first display interface and a second display interface.

Step S202 may include at least one of the following:

determining the first target display area based on a position connecting the first display interface and the second display interface;

determining the first target display area based on display contents of the first display interface and/or the second display interface;

determining the first target display area based on usage information of the first display interface and/or the second display interface.

In the present embodiment, the target display area can be set at the interface connection between the first display interface and the second display interface.

Alternatively, according to the display contents of the first display interface and/or the second display interface, the blank display area corresponding to the first display interface and/or the blank display area corresponding to the second display interface are determined. And the target display area is determined according to the blank display area corresponding to the first display interface and/or the blank display area corresponding to the second display interface, so as to set the target display area on the first display interface and/or the second display interface. The target display area can be independently set on the first display interface or the second display interface, or the target display area may include a plurality of areas and is respectively set on the first display interface and the first display interface Alternatively, based on the usage information of the first display interface and/or the second display interface, a target display area is determined so as to set the target display area on the first display interface and/or the second display interface. The target display area can be independently set on the first display interface or the second display interface, or the target display area may include a plurality of areas and is respectively set on the first display interface and the second display interface.

Further, in one embodiment, a display quantity and/or a position of the target function icon corresponding to the sidebar is at least one of the following:

determining the display quantity and/or position of the target function icon based on the maximum blank display area in the first display interface and/or the maximum blank display area in the second display interface;

determining the display quantity and/or the position of the target function icons based on the display contents of the first display interface and/or the second display interface;

determining the display quantity and/or the position of the target function icons based on the usage information of the first display interface and/or the second display interface;

In the present embodiment, the target display area includes the largest blank display area in the first display interface and/or the largest blank display area in the second display interface, and the display quantity and/or position of the target function icons can be determined according to the area of the largest blank display area in the first display interface and/or the area of the largest blank display area in the second display interface to clearly display the target function icons by the target display area.

Alternatively, based on the display contents of the first display interface and/or the second display interface, the blank display area in the first display interface and/or the blank display area in the second display interface are determined, and the display quantity and/or position of the target function icons are determined. The blank display area in the first display interface and/or the blank display area in the second display interface can thus completely display the determined target function icons, and priority can be set for all the blank display areas. The target function icon is positioned based on its respective priority, and the target function icon with high priority can be displayed in a blank display area with high priority.

Alternatively, based on the usage information of the first display interface and/or of the second display interface, the display quantity of the target function icon associated with the usage information can be determined, and the target function icon can be positioned according to the target display area.

Further, in one embodiment, the operation of determining the display quantity and/or position of the target function icon based on the maximum blank display area in the first display interface and/or the maximum blank display area in the second display interface, comprises:

Operation c, determining a number of function icons displayed in the second display area based on an area of the second display area;

Operation d, determining the display quantity and/or the position of the target function icon, based on the display quantity of the function icon, the application corresponding to the display interface and the application to which each function icon in the usage information belongs.

In some embodiment, the number of function icon displays corresponding to the maximum blank display area is determined according to the area of the maximum blank display area and the display area of a single function icon in the usage information. The number of function icons that can be displayed in the maximum blank display area is determined.

The display quantity and/or the position of the target function icon are then determined, based on the display quantity of the function icon, the application corresponding to the display interface and the application to which each function icon in the usage information belongs.

Specifically, among the function icons in the usage information, if the number of function icons that belong to applications corresponding to the first display interface is greater than or equal to the display quantity of function icons corresponding to the first display interface (the capacity of function icons that can be displayed at most in the largest blank display area on the first display interface), the function icon with the highest priority among the function icons can be displayed in the target display area of the first display interface, and other function icons can be displayed in the target display area of the second display interface.

Further, in some embodiment, the operation S202 may include:

Operation S2021, determining a first maximum blank display area on the first display interface based on the display content in the first display interface and determining a second maximum blank display area on the second display interface based on the display content in the second display interface;

Operation S2022, determining a fourth target function icon based on the first maximum blank display area and the usage information, and determining a fifth target function icon based on the fourth target function icon and the usage information;

Operation S203 includes:

displaying the fourth target function icon in the first maximum blank display area and displaying the fifth target function icon in the second maximum blank display area.

In the present embodiment, when the usage information is acquired, the first maximum blank display area in the first display interface is determined based on the display content in the first display interface, and the display content in the second display interface is determined to determine the second maximum blank display area in the second display interface. As such, the maximum blank display area in each display interface can be acquired, respectively.

Afterwards, the fourth target function icon is determined based on the first maximum blank display area and the usage information, and the fifth target function icon is determined based on the fourth target function icon and the usage information. Specifically, the number of function icons can be determined respectively that can be displayed in the first maximum blank display area and the second maximum blank display area at their largest capacities. And the fourth target function icon and the fifth target function icon are determined according to these numbers.

Further, after operation S203, the method further includes:

Operation S204, in response to a determination that the unread messages of the application corresponding to the display interface is detected and a number of the unread messages is no less than a preset value, determining whether a sub-function icon corresponding to the unread messages exists in the sidebar;

In the embodiment described above, unread messages of the application corresponding to the display interface are monitored in real-time, and when new unread messages are detected, the quantity of current unread messages is accumulated. If the accumulated quantity is greater than a preset value, it is determined whether a sub-function icon corresponding to the unread messages is already existed in the sidebar. And if so, a sub-function icon is displayed for the user to operate correspondingly, for example, reading the unread messages, etc.

Further, in some embodiment, the usage information includes brightness of the terminal, and the display brightness of the sidebar or the transparency of icons displayed in the sidebar can both be adjusted according to the brightness.

By adjusting the display brightness of the sidebar or the transparency of icons in the sidebar according to the brightness currently applied, the sidebar is prevented from interfering with other information displayed on the display interface.

Further, after operation S203, the method further includes:

Operation S205, in response to a movement operation triggered by the sidebar being detected, acquiring a touch endpoint corresponding to the movement operation;

Operation S206, displaying the sidebar in a display area corresponding to the touch endpoint.

In the embodiment describe above, after displaying the sidebar, the position where to display the sidebar can be decided and moved at user's will. When a moving operation is detected triggered regarding the sidebar, the touch endpoint corresponding to the movement operation is acquired. The sidebar can be displayed at the display area corresponding to the touch endpoint, so that the user can place the sidebar at a position according to his will.

It should be appreciated that if the display screen of the terminal is a foldable screen and the touch end point is in the middle of the foldable screen (the junction between the two display areas of the foldable screen), the sidebar can be displayed at the junction between the two display areas.

Further, the display screen of the terminal is a foldable screen, and the display interface comprises a plurality of display interfaces formed and by the foldable screens; or the display screen of the terminal is splittable to form a plurality of display interfaces. And after operation S203, the method further includes: if it is detected that a display interface is switched to a screen display horizontally placed, determining a second target display area according to the usage information; and displaying the sidebar in the second target display area.

It should be appreciated that the method for determining the second target display area and the method for displaying the sidebar in the second target display area are similar to those in other embodiments described above, and will not be repeated herein.

The method proposed in the embodiments described above determines a first maximum blank display area in the first display interface based on the display content in the first display interface and a second maximum blank display area in the second display interface based on the display content in the second display interface. Then it is determined a fourth target function icon based on the first maximum blank display area and the usage information, and determines a fifth target function icon based on the fourth target function icon and the usage information. The fourth target function icon is displayed in the first maximum blank display area and the fifth target function icon is displayed in the second maximum blank display area, so that part of the function icons of the sidebar can be respectively displayed according to the first maximum blank display area and the second maximum blank display area. It may prevent the sidebar from influencing the information displayed on the display interface and further improves the user experience.

Further, based on the aforementioned embodiments of the present disclosure, a sixth series of embodiments showing the sidebar interaction method of the present disclosure are proposed.

The embodiments are refinement of operation S203 in the first series of embodiments. The difference between the present embodiment and the embodiments above lies in that:

Operation S2031, in response to at least two application displays being detected, determining whether the applications meet preset conditions;

Operation S2032, in response to the preset conditions being met, displaying a sidebar corresponding to the usage information in the first target display area.

The method regarding the embodiments described above can be applied to a mobile terminal, which has a plurality of applications for various functions, including video applications, browser applications, reader applications, communication applications, etc. A user can start corresponding applications on the display interface of the mobile terminal by manual operation or by voice, and the applications are displayed on the display interface. If the user initiates more than two applications for display simultaneously, the mobile terminal can display on the display interface each application. The display can be set in real practice. For example, the display interface can be divided equally of the mobile terminal, when the current mobile terminal is to display two applications, and the respective display interfaces of the two applications account for half of the display interface. Or the display interface of the mobile terminal can be irregularly divided. If the current mobile terminal is to display three applications, the display interface of the mobile terminal is first divided into an upper display area and a lower display area, and then the upper area is divided into two display areas, i.e. two applications are displayed in the upper area, one application is displayed in the lower area, etc. The specific display mode is not specifically limited herein.

When the mobile terminal of present embodiment detects that at least two applications are displayed, it is firstly determined whether the preset conditions are met before determining whether to display the sidebar.

Each operation will be described with details.

Operation S2031, in response to at least two applications displayed being detected, determining whether the applications meet preset conditions.

In the embodiment described above, if the mobile terminal detects that at least two applications are displayed, that is, multiple applications are simultaneously opened and displayed on the display interface of the mobile terminal. It is then determined whether the applications currently displayed on the display interface of the mobile terminal meet preset conditions. The preset conditions are conditions that are set in advance, and specifically include whether the types of each application currently displayed on the display interface of the mobile terminal are consistent. And if so, it is determined that each applications currently displayed on the display interface of the mobile terminal meets the preset conditions; if not, it is determined that each application currently displayed on the mobile terminal display interface does not meet the preset conditions.

Specifically, operation S2031 may include:

Operation a1, if it is detected that at least two applications are displayed, detecting a category attribute to which each application belongs.

More specifically, if the mobile terminal detects that at least two applications are displayed, the mobile terminal further detects the category attribute that these two applications belongs to. The category attribute may include browsing, video communication, text communication, audio, etc. The category attribute of the application can be divided according to the function of the application. For example, if the current application is an instant messaging application, it can serve for on-line videoing. Therefore, the current application belongs to the video communication in category. If the current application is a reading application, it can serve for reading and browsing, and the current application belongs to browsing in category; if the current application is a music player, it can serve for multimedia playing, and the current application belongs to audio in category, etc.

The functionality of the application can be determined according to its application package name in real practice, and then the category attribute to which the application belongs can be determined according to this functionality.

Operation a2, determining whether the application meets a preset condition based on category attribute of each application.

The mobile terminal determines whether the applications currently displayed on the mobile terminal display interface meet the preset conditions according to the category attributes to which each application currently belongs. Specifically, it may determine whether the category attributes to which each application belongs are consistent. And if so, it is determined that the applications currently displayed on the mobile terminal display interface meet the preset conditions; if not, it is determined that the application currently displayed on the display interface of the mobile terminal does not meet the preset conditions. For example, the applications currently displayed on the display interface of the mobile terminal include video communication applications and live broadcast applications. Since the functions of both applications are to realize video transmission and belong to the category of video communication, the category attributes of the two applications are consistent. The applications currently displayed on the display interface of the mobile terminal are determined to meet the preset conditions. Or if the applications currently displayed on the display interface of the mobile terminal include video communication applications and reading applications, the applications currently displayed on the display interface of the mobile terminal do not meet preset conditions due to the different types and category attributes to which the two applications belong to.

Further, operation S2031 may include:

Operation a3, if the display of at least two applications is detected, determining the display contents of the applications.

In the embodiment described above, if the mobile terminal detects that there are at least two applications are currently displayed on the display interface of the mobile terminal, the display content displayed in the display interface of each application is acquired. The display content includes text, images, video and audio, etc. The mobile terminal can specifically identify the display interface of each application to determine the display content of each application.

Operation a4, determining whether the application meets a preset condition based on display content of each application.

In the present embodiment, the mobile terminal determines whether the applications currently displayed on the display interface of the mobile terminal meet the preset conditions according to the display contents of the current applications. It is, specifically, determined whether the display contents of the applications belong to the same format. That is, whether the display contents of the applications are all in text format, or are all in image format, or are all in video format, or are all in audio format, etc. If so, it is determined that the applications currently displayed on the display interface of the mobile terminal meet the preset conditions; if not, it is determined that the application currently displayed on the mobile terminal display interface does not meet the preset conditions. For example, the application currently displayed on the display interface of the mobile terminal includes two browsers, and the display content of each browser is text. The display content of the two applications belong to the same format, and the application currently displayed on the display interface of the terminal meets the preset conditions. As another example, if the application displayed on the current mobile terminal display interface includes a video application and a reading application, since the display contents displayed by the two are one in text format and one in video format, the display contents displayed by the two are different, and the application currently displayed on the mobile terminal display interface does not meet preset conditions.

Further, operation S2031 may include:

Operation a5, if the display of at least two applications is detected, determining the quantity of the applications.

In the present embodiment, the sidebar may increasingly block the display interface of some applications if more applications displayed on the mobile terminal. If the mobile terminal detects that at least two applications are currently displayed on the display interface of the mobile terminal. The quantity of currently displayed applications can be determined. The quantity of applications currently displayed on the display interface of the mobile terminal can be counted.

Operation a4, determining whether the application meets a preset condition based on the quantity of the applications.

In the present embodiment, the mobile terminal determines whether the applications currently displayed on the display interface of the mobile terminal meet the preset conditions according to the quantity of currently displayed applications. The quantity of applications are specifically calculated and compared with a preset number. It is then determined whether this value does not exceed the preset number. If so, it can be determined that the applications currently displayed on the display interface of the mobile terminal meet the preset conditions; if not, it is determined that the application currently displayed on the display interface of the mobile terminal does not meet the preset conditions. For example, the applications currently displayed on the mobile terminal display interface may include 6 applications, and the preset number is 4. It is determined that 6 is larger than 4, so the applications currently displayed on the terminal display interface do not meet the preset conditions. If the application displayed on the current mobile terminal display interface includes 3 applications. It is then determined that 3 is no larger than 4, so the application currently displayed on the mobile terminal display interface meets preset conditions, etc.

Further, operation S2031 may include:

Operation a3, if the display of at least two applications is detected, determining the area of the display interface of the applications.

In the present embodiment, if the mobile terminal detects that at least two applications are currently displayed on the display interface of the mobile terminal, the area of the display interface regarding each application can be calculated. The quantity of the display interface of the mobile terminal is taken as 1. If there is only one application currently displayed on the display interface of the mobile terminal, the quantity of the display interface of each application is 1. If there are two applications currently displayed on the display interface of the mobile terminal, and the quantity of the display interface of each application is 0.5, etc.

Operation a8, based on the size of each display interface, determining whether the application meets the preset conditions.

In the present embodiment, the mobile terminal determines whether the applications currently displayed on the display interface of the mobile terminal meet the preset conditions according to the size of the display interface of each current application. It is specifically determined the size of the display interface of each application, and whether at least one target application existed in each application, the size of the display interface of which is not larger than the preset area. And if so, it is determined that the application currently displayed on the display interface of the mobile terminal does not meet the preset conditions; if not, that is, the size of the display interface of each applications is larger than the preset area, it is determined that the applications currently displayed on the display interface of the mobile terminal meet the preset conditions. For example, the application currently displayed on the display interface of the mobile terminal includes two applications. The size of the display interface of each application is 0.5, and the preset area is 0.25. Since 0.5 is larger than 0.25, the application currently displayed on the display interface of the terminal meets the preset conditions. If the applications displayed on the current mobile terminal display interface include three applications, and two applications are displayed in the upper area and one in the lower area, that is, the size of the display interfaces of each of the two applications in the upper area is 0.25, and the size of the display interfaces of the applications in the lower area is 0.5. Since the size of the display interfaces of the target applications is not greater than the preset area of 0.25, the applications currently displayed on the mobile terminal display interface do not meet the preset conditions, etc.

Further, operation S2031 may include:

Operation a9, if the display of at least two applications is detected, determining the positions where the applications are displayed on the display interface.

In the present embodiment, if the mobile terminal detects that at least two or more applications are currently displayed on display interface of the mobile terminal, the location of each application on the display interface is determined, that is, the preset location of each application on the mobile terminal display interface is determined, respectively.

Operation a10, based on the position of each application on the display interface, determining whether the application meets the preset conditions.

In the present embodiment, the mobile terminal determines whether the applications currently displayed on the display interface of the mobile terminal meet the preset conditions according to the positions of the applications on the display interfaces. It can be specifically determined that the positions on the display interfaces of the applications, and it can be further determined that whether the positions of the display interfaces of the applications meet the preset layout. A plurality of layouts are set in advance, and it can be determined that the applications currently displayed on the display interface of the mobile terminal meet the preset conditions as long as the positions of the applications on the display interface meet the preset layout.

Operation S2032, if the preset conditions are met, displaying the sidebar.

In the present embodiment, if the applications currently displayed on the display interface of the mobile terminal meet the preset conditions, the types and attributes to which each application belongs are consistent. A sidebar can be displayed, which may include function items for realizing multiple functions, such as a function regarding beautification, a recording function, etc.

Further, in another embodiment, operation S2032 includes:

Operation b1, in response to the preset conditions being met, determining a displaying mode to display the sidebar;

In this operation, if it is determined that the application currently displayed on the display interface of the mobile terminal meets the preset conditions, the display mode of the sidebar can be determined.

A mapping table can be set in advance plotting the relationship between category attribute and display mode to which the application belongs. After determining the category attribute to which the application currently displayed on the display interface of the mobile terminal belongs, the display mode of the sidebar can be determined through this mapping table.

Figure 13:
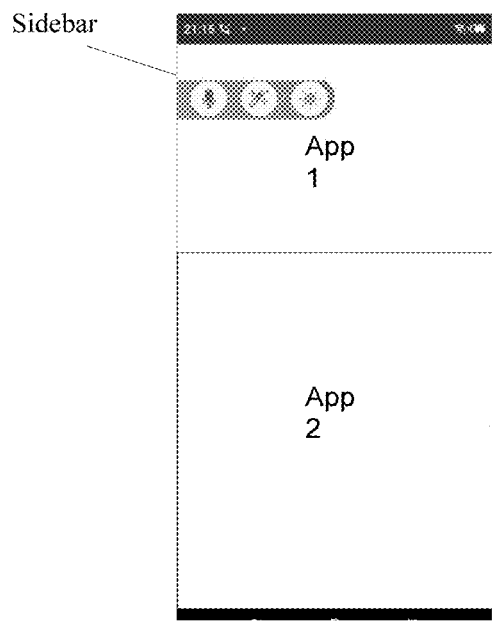
FIG. 13 is a schematic view showing a specific detail of a sidebar interaction method according to a sixth embodiment of the present disclosure.

Operation b2, displaying the sidebar according to the displaying mode;

In this operation, after the display mode is determined, the sidebar can be displayed according to the display mode. The display mode includes a shared display. It may further indicates that one sidebar can be displayed on the display interface of the mobile terminal, i.e. the applications on the display interface of the mobile terminal share the same sidebar. As shown in FIG. 13, the applications currently displayed on the display interface of the mobile terminal include application 1 and application 2, and one sidebar is shared and displayed on the display interface of the mobile terminal. The function items on the sidebar can trigger the corresponding functions to each of the two applications. For example, beautification can be applied simultaneously to both of video communication, including video chat and video live broadcast; or recording can be applied simultaneously to both voice communication and voice intercom.

Figure 14:
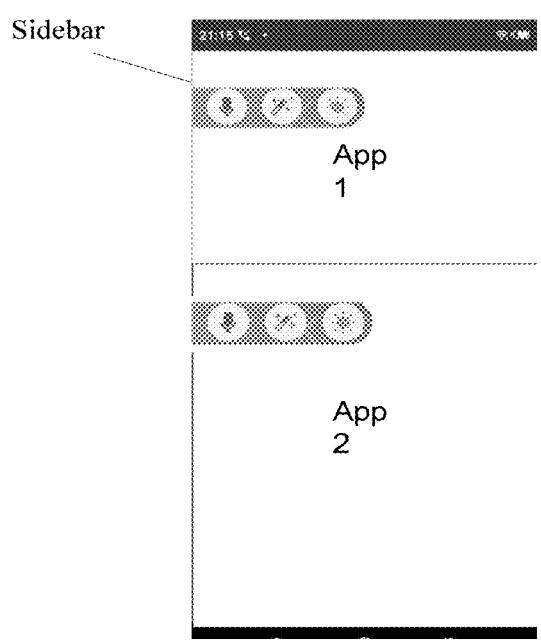
FIG. 14 is a schematic view showing another specific detail of a sidebar interaction method according to a sixth embodiment of the present disclosure.

Or sidebar can be displayed separately. One sidebar is displayed on the display area of each application on its display interface, and each application uses one sidebar on the display interface of the mobile terminal. As shown in FIG. 14, the applications currently displayed on the display interface of the mobile terminal include application 1 and application 2. On the display interface of the mobile terminal, each application displays with one sidebar, the function items on the sidebar can trigger the corresponding function to the application where the sidebar is located and corresponds to. For example, application 1 may apply the function with beautification while application 2 may apply the recording simultaneously, etc.

It should be appreciated that it is also possible to display sidebars of a size suitable for the display interface of each application. For example, one application currently displayed on the display interface of the mobile terminal is displayed 100%, and when there are two applications displayed on the current display interface, the sidebar for each application is displayed at 50% of its original size.

Further, in another embodiment, after operation S20, the method may further include:

Operation c, if an instruction based on the sidebar is detected to execute a function, executing an operation corresponding to the instruction.

In this operation, after the mobile terminal displays the sidebar on the display interface, the user can click on sidebar to trigger the corresponding instruction. If the mobile terminal detects the execution instruction triggered on the sidebar, it will execute the function operation corresponding to the current instruction. For example, the applications currently displayed on the display interface of the mobile terminal include an application for video communication and an application for live broadcast. After the sidebar is displayed, the user can click beautification item in the sidebar to trigger a beautification instruction. After the mobile terminal detects this beautification instruction, the mobile terminal can call the beauty module to beautify the portrait captured by the camera of the mobile terminal. In another example, the display interface of the mobile terminal currently displays two reading applications. After the sidebar is displayed, the user can click the item for eye-protection in the sidebar to trigger the eye protection instruction. After the mobile terminal detects the eye protection instruction, it calls the eye protection module to adjust the brightness of the display interface of the mobile terminal.

Further, the operation C may include:

in response to an execution instruction regarding the sidebar being detected, determining a target application corresponding to the execution instruction, wherein the target application comprises one or more applications;

In this operation, when a plurality of applications are displayed on the display interface of the mobile terminal, it can be judged that the sidebar controls one application or simultaneously controls a plurality of applications according to the type attribute of the applications. If the mobile terminal detects an instruction on the sidebar, the target application corresponding to the execution instruction is determined. The target application may include one application or a plurality of applications. The target application corresponding to the instruction can be determined according to the type of the currently displayed application and the function item corresponding to the instruction.

Based on the target application, the functional operation corresponding to the instruction is executed.

In this operation, the function operation is performed on the target application correspondingly, i.e. the target application is controlled correspondingly. For example, the currently displayed applications are A, B and C, where A and B are video-relevant applications. If the user clicks the function with beautification item in the sidebar, the function with beautification is performed on A and B, while no function is performed to C, etc.

In the present embodiment, if at least two applications is detected on the display, it is determined whether the applications meet preset conditions; if yes, the sidebar is displayed. When multiple applications are displayed, complication in display increases. The mobile terminal can determine whether to display a sidebar by determining whether the currently displayed applications meet preset conditions. The mobile terminal can then adaptively display the sidebar under different application scenarios, and the intelligence of the mobile terminal is improved. The display interaction of the sidebar is then realized.

Further, based on the sixth series of embodiments regarding the sidebar interaction method of the present disclosure, a seventh series of embodiments is proposed.

After operation S302, the sidebar interaction method may further include:

Operation d, determining whether the sidebar meets the condition for exit, and if so, exiting the sidebar.

In the present embodiment, the mobile terminal monitors in real-time whether the sidebar meets the condition for exiting itself after displaying the sidebar, and if so, the sidebar would be exited. The sidebar would be closed and the condition for exiting the sidebar is a condition set in advance.

Specifically, the operation of determining whether the sidebar meets the condition for exit, includes at least one of the following operations:

Operation d1, determining a first category attribute to which the application belongs, and determining whether the sidebar meets a condition for exiting the sidebar based on the first category attribute.

In the present operation, the mobile terminal monitors in real-time the displayed application, and specifically determines the first category attribute to which the currently displayed application belongs. It can be then determined that whether the current sidebar meets the condition for exiting the sidebar according to the first category attribute. It can be determined specifically whether the number of the applications having a same first category attribute to which the application belongs, reaches a preset threshold. And if not, it can be determined that the current sidebar meets the condition for exiting the sidebar.

Operation d2, determining the display content of the application, and determining whether the sidebar meets the condition for exiting the sidebar based on the display content;

In this operation, the mobile terminal monitors in real-time the display content of the currently displayed application, and then determines whether the current sidebar meets the condition for exiting itself according to the display content which may include text, image, video, audio, etc. It can be specifically determined whether the display content of each application is of a same format, that is, whether the display content of each application is text, image, video, audio, etc. And if not, it can be determined that it meets the condition for exiting the currently displayed sidebar, etc.

Operation d3, determining a first number of the applications, and determining whether it meets a condition for exiting the sidebar based on the first number;

In this operation, the mobile terminal monitors the currently displayed applications in real-time so as to acquire the first number and determine whether the currently displayed it meets the condition for exiting the sidebar. The first number of applications can be specifically calculated, and compared with the preset number. It can be then determined whether the number of currently displayed applications exceeds the preset number. And if so, it can be determined that it currently meets the condition for exiting the sidebar, etc.

Operation d4, determining the size of the display interface of the application, and determining whether the sidebar meets the condition for exiting the sidebar based on the size of the display interface;

In this operation, the mobile terminal monitors in real time the size of the display interface of the currently displayed application and determines whether it currently meets the condition for exiting the sidebar. It can be specifically calculated the size of the display interface of each application and whether at least one target application exists among all applications can be determined, the size of the display interface of which is not larger than a preset area. And if so, it can be determined that it currently meets the condition for exiting the sidebar.

Step d5, determining the position of the application on the display interface, and determining whether it meets the condition for exiting the sidebar based on the position on the display interface;

In this operation, the mobile terminal monitors in real-time the position on the display interface of the currently displayed application, so as to determine whether it currently meets the condition for exiting the sidebar. The position of each application on the display interface can be specifically determined, and it can be determined whether the position regarding each application on the display interface meets the preset layout. A plurality of layouts can be set in advance. As long as the position of the applications on the display interface does not meet the preset layout, it can be determined that it currently meets the condition for exiting the sidebar, etc.

Step d6, determining a second category attribute to which a non-operating application belongs, and determining whether it meets the condition for exiting the sidebar based on the second category attribute;

In this operation, the mobile terminal does not need to monitor the category attribute of the currently displayed application, but monitors the category attribute of the application that has not operating. The second category attribute of the application that is closed or asleep, so as to determine whether the currently displayed sidebar meets the condition for exiting the sidebar according to the second category attribute. It can be determined specifically whether the attribute of the non-operating applications are consistent in category. And if so, it can be determined that it currently meets the condition for exiting the sidebar, etc.

Step d7, determining the position of the non-operating application, and determining whether the sidebar meets the condition for exiting the sidebar based on the position of the non-operating application;

In the present operation, the mobile terminal monitors the position of the application that is no longer operating. The position may refer to the layout position of the application that is no longer operating on the desktop of the mobile terminal. It can be specifically determined whether the position of these non-operating applications meets the preset layout. And if so, it can be determined that it currently meets the condition for exiting the sidebar, etc.

Operation d8, determining a second number of applications that is not operating, and based on the second number, determining whether it meets the condition for exiting the sidebar.

In the present operation, the mobile terminal monitors the second number of applications that have not run, so as to determine whether it currently meets the condition for exiting the sidebars. It can be specifically counted the second number of these non-operating applications as well as the total number of applications installed in the mobile terminal. If this second number meets a preset proportion to the total number, and the percentage reaches the preset percentage by calculating the percentage of the second number in respect to the total number, it can be determined that it currently meets the condition for exiting the sidebars, etc.

Further, after Operation S203, the sidebar interaction method may further include:

Operation e, in response to a switching instruction regarding the applications being detected, switching and displaying a target application corresponding to the switching instruction, and adjusting the sidebar based on the target application.

In the present embodiment, when multiple applications require various function items in different sidebars, the sidebars can be adjusted and displayed according to the requirement. The mobile terminal can distinguish different applications, thereby opening different sidebars for different applications.

More specifically, after the sidebar is displayed, the target application can be switched to corresponding to the switching instruction, if an instruction is detected to switch between the applications. And the function items of the sidebar are correspondingly adjusted. It should be appreciated that the application displayed has changed and switch. For example, applications A, B and C are displayed originally. After the display has been switched, the currently displayed applications are applications B, C, and D. Function with beautification may be required originally and recording is desired at present. Therefore, the function items in the sidebar need to be adjusted correspondingly to the newly switched application, etc.

The sidebar interaction method may further include the following operations:

Operation f, displaying the sidebar;

Operation g, in response to at least two applications are displayed, adjusting a function item of the sidebar and/or the display position of the sidebar based on the applications.

In the present embodiment, the sidebar is specifically displayed on the display interface of the mobile terminal, then the currently displayed applications are monitored in real-time. When at least two application displays are detected, the display positions of the sidebar, and the function items in the sidebar are adjusted according to the currently displayed application.

The adjustment can be specifically made according to the quantity, type, display content and the like, of currently displayed applications. The adjustment can refer to the preset conditions or exit conditions described in the aforementioned embodiments, and will not be repeated herein.

Figure 15:
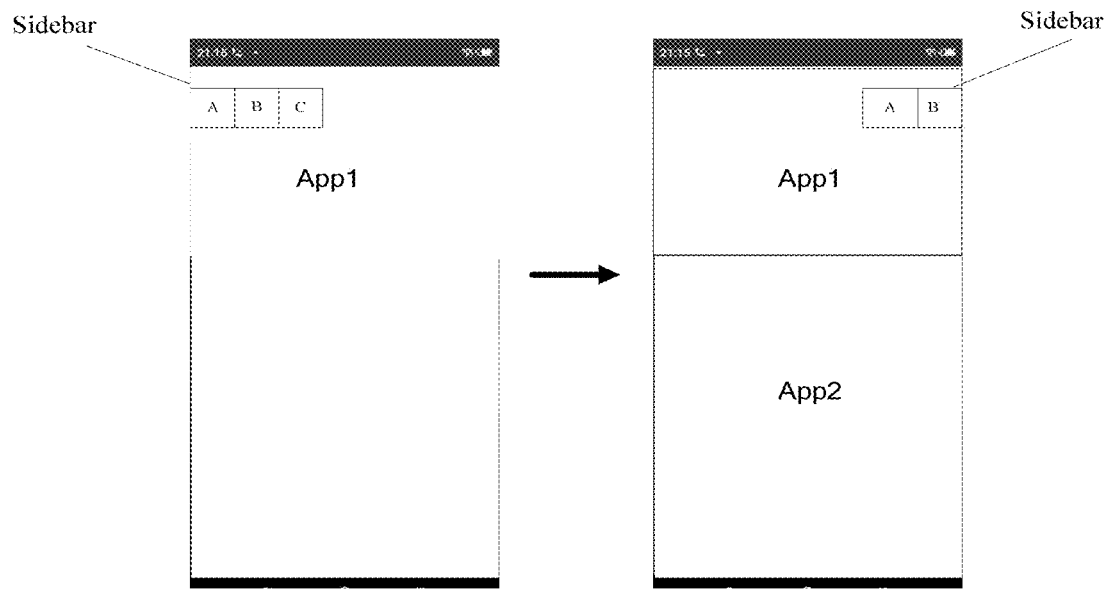
FIG. 15 is a schematic view showing a specific detail of a sidebar interaction method according to a seventh embodiment of the present disclosure.

Referring to FIG. 15, the display position of the sidebar is initially displayed on the left side, and the function item that is displayed includes items A, B, and C. When at least two applications are currently detected to be displayed, the sidebar can be adjusted to the right side, and the function item that is displayed can be adjusted to function items A and B, so as to adapt to specific conditions.

The sidebar in present embodiment can be displayed constantly, and the position where to display the function items and/or sidebars of the sidebar can be adjusted according to the currently displayed applications, so as to adapt to specific conditions, improve the intelligence of the mobile terminal, and realize the intelligent display of the sidebar.

Further, based on the first series of embodiments in respect to the sidebar interaction method of the present disclosure, an eighth series of embodiment of the sidebar interaction method is proposed.

The back-end application can be an application for video communication, and operation S20 includes:

Operation S204, in response to an instruction to initiate the video call being detected, displaying an interface of the video call, and displaying a sidebar for auxiliary application on the interface of the video call.

In the present embodiment, if an instruction is detected to start a video call, an interface regarding the video call is displayed. Optionally, the instruction can be trigger by voice. For example, a voice instruction is received before the voice information is detected corresponding to the voice instruction. It is then detected that whether this voice information matches with the preset voice information. If yes, the operation corresponding to the voice instruction is executed. The video call can be initiated and the interface of the video call can be displayed in the display area of the touch screen. Alternatively, the instruction to start the video call can be triggered by motion. A start button for the video call can be displayed on the display interface of the touch screen. If the user clicks or presses the start button for a preset time duration, the video call can be initiated and the interface for the video call can be displayed on the display interface. Optionally, if it is detected that the user's touch is drawn from the lower limit line to the upper limit line of the touch screen, or that the user is drawn from the upper limit line to the lower limit line, or that the user is drawn from the left limit line to the right limit line of the display screen, or that the user is drawn from the right limit line to the left limit line of the display screen, the video call can be initiated and the interface of the video call can be displayed on the display interface.

Figure 16:
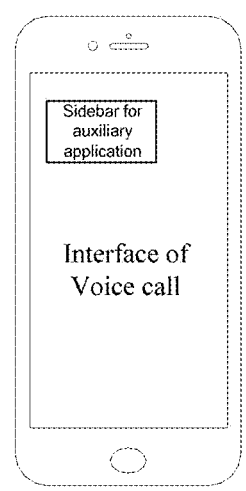
FIG. 16 is a schematic view showing a first specific detail of a sidebar interaction method according to an eighth embodiment of the present disclosure.

After the video call is initiated, the front and/or rear cameras can be initiated, acquiring in real-time the video images collected by the front and/or rear cameras. And the video images are displayed on the interface of the video call. After the interface of the video call is displayed, a sidebar for auxiliary application can be displayed on the interface of the video call. As shown in FIG. 16, which is a schematic view showing a first specific detail of the sidebar interaction method of the present disclosure. A sidebar for auxiliary application is displayed on the interface of the video call. For example, the application for beautification can be set-up by the user corresponding to the sidebar for auxiliary application displayed on the interface of the video call. A setting module in respect to the video call can be provided associated with a third-party application function module. The user can click the associated third-party application function module to set the associated third-party application by himself. For example, if it is detected that the user clicks the associated button corresponding to the associated third-party application function module, an option can be popped up and display at that bottom to provide an option to associate with a third party application, such as a first beautification application, a second beautification application, a third beautification application, a fourth beautification application and the like. If it is detected that the user clicks on the first beautification application and the second beautification application, the first beautification application and the second beautification application can be associated with the current video calling. Priority can be further set regarding the associated beautification applications. For example, if a priority is set on the first beautification application, the interface of the video call can be displayed when it is detected that an instruction to start the video call. And the first sidebar for auxiliary application corresponding to the first beautification application is preferentially displayed. The user may further press the first sidebar for auxiliary application for a preset time duration and slide the first sidebar to the right or left side to display the second sidebar for second beautification application which is originally hidden on the interface of the video call.

Further, after operation S204, the method may include:

Operation S205, hiding the sidebar for auxiliary application and displaying the at least one auxiliary program icon on the interface of the video call;

Operation S206, executing a touch operation on the auxiliary program icon and responding to the touch operation.

Figure 17:
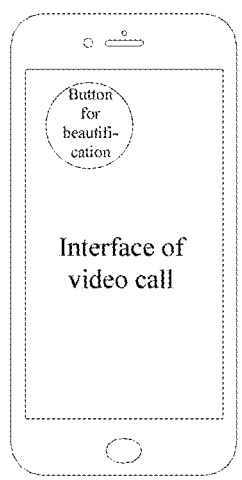
FIG. 17 is a schematic view showing a second specific detail of the sidebar interaction method according to the eighth embodiment of the present disclosure.

After the sidebar for auxiliary application is displayed on the interface of the video call, the sidebar for auxiliary application can be hidden after a first preset time. And an auxiliary button corresponding to the sidebar for auxiliary application can be displayed on the interface of the video call. Optionally, the first preset time can be flexibly set. For example, the sidebar for auxiliary application can be hidden, and button for auxiliary functions corresponding to the sidebar for auxiliary application can be displayed on the video call display interface three seconds after the sidebar for auxiliary application is displayed on the interface of the video call. As shown in FIG. 17 a schematic view showing a second specific detail of the sidebar interaction method of the present disclosure. After the sidebar for auxiliary application is hidden, at least one auxiliary program icon can be displayed on the interface of the video call, or the button for auxiliary function can be correspondingly displayed at where the sidebar for auxiliary application is originally placed and displayed.

In the present embodiment, various auxiliary functions can be realized based on the button for auxiliary function. Based on the touch operation corresponding to the button for auxiliary function, the instruction corresponding to the touch operation can be specifically acquired and the auxiliary function corresponding to the instruction can be executed. Thus, after the button for auxiliary function corresponding to the sidebar for auxiliary application is displayed on the interface of the video call, the touch operation corresponding to the button for auxiliary function needs to be detected in real-time and responded to. And optionally, touch control parameters can be acquired, when the touch control operation corresponding to the button for auxiliary function is detected. The touch control parameters may optionally include touch control pressure, touch control time, and/or touch control motions, etc. After the touch control parameters are acquired, it is detected that whether the touch control parameters meet the preset touch control conditions. If the touch control parameters meet the preset touch control conditions, then the touch control operation can be responded. The preset touch control conditions may include preset touch control pressure, preset touch control time, and/or preset touch control motions, etc. For example, if it is detected that the touch pressure corresponding to the touch operation reaches the preset touch pressure, the touch time corresponding to the touch operation reaches the preset touch time, and/or the touch motion corresponding to the touch operation meets the preset touch motion, the touch operation can be responded.

Further, after operation S205, the method may include:

Operation S206, judging whether touch operation regarding an button for auxiliary function is detected;

Operation S207, in response to touch operation corresponding to the button for auxiliary function being detected, increasing a color depth of the button for auxiliary function, and/or reducing transparency of the button for auxiliary function;

Operation S208, in response to the touch operation corresponding to the button for auxiliary function failed to be detected, reducing a color depth and/or a display area of the button for auxiliary function, and/or increasing transparency of the button for auxiliary function, and/or moving the button for auxiliary function to a sidebar and hiding the button for auxiliary function.

In the present embodiment, it should be appreciated that after the sidebar for auxiliary application is hidden and the function button corresponding to the sidebar for auxiliary beautification application is displayed on the interface of the video call, it can be determined whether the touch operation corresponding to the function with beautification button for auxiliary function is detected. For example, the auxiliary function is for beautification, and if the touch operation is detected corresponding to a button for beautification, the color depth of the button corresponding to the beautification function can be increased, and/or the transparency of the button corresponding to beautification can be reduced. Further, the level of color depth can be determined based on the touch pressure or the number of touches. The level of color depth may have 7 levels. For example, when the function with beautification button is initially displayed on the interface of the video call, the color depth of the button regarding the beautification is at the 4th level. If it is detected the first touch operation corresponding to the button, the color depth of the function with beautification button is changed to the 5th level; if the second touch operation corresponding to the button is detected, the color depth of the function with beautification button is changed to the 6th level.

It should be appreciated that in order to enable the user clear about whether the auxiliary function is currently being used or not, the color depth of the button for auxiliary function can be reduced and/or the transparency of the button for auxiliary function can be increased, when the touch operation corresponding to the button is not detected. Optionally, based on the interval time for failing to detect the touch operation corresponding to the button for auxiliary function, the reduced color depth level is determined. As described in the above embodiment, the color depth level has 7 levels. When the button for auxiliary function is initially displayed on the interface of the video call, the color depth level of the button for auxiliary function is at the fourth level. If a touch operation corresponding to the button for auxiliary function is not detected within the first preset interval time, the color depth of the button for auxiliary function is reduced to the third level. And if the touch operation corresponding to the button for auxiliary function is not detected within a second preset interval time, the color depth of the button for auxiliary function is further reduced to the second level. The second preset interval time is greater than the first preset interval time.

It should be appreciated that if the touch operation corresponding to the button for auxiliary function is not detected, the area for displaying the button for auxiliary function can be reduced. Optionally, the button for auxiliary function can be reduced into half of the original area, and/or the button for auxiliary function can be move to the sidebar to hide the corresponding display.

Further, after operation S206, the method may include:

Operation S209, in response to an instruction being detected to close the video call, closing the interface of the video call;

Operation S2010, switching off the auxiliary function and hiding the auxiliary function button.

In this operation, it should be appreciated that if an instruction is detected to close the video call, the interface of the video call as well as the auxiliary function can be closed. The button for auxiliary function can be hidden and undisplayed.

According to the method provided by the embodiment, it is determined whether the touch operation corresponding to the button for auxiliary function is detected. If the touch operation corresponding to the button for auxiliary function is detected, the color depth of the button for auxiliary function can increased, and/or the transparency of the button for auxiliary function can reduced. And if the touch operation corresponding to the button for auxiliary function is not detected, the color display depth of the button for auxiliary function can be reduced, and/or the transparency of the button for auxiliary function can be increased, and/or the area for displaying the button for auxiliary function can be reduced. The button for beautification, for example, can be distinguished clearly, and the user experience can thus be further improved.

Further, based on the eighth series of embodiments in respect to the sidebar interaction method of the present disclosure, a ninth series of embodiment of the sidebar interaction method is proposed.

In the following embodiment, operation S206 may include:

Operation S2061, responding to the touch operation, and initiating a corresponding function, displaying the function on the interface of the video call, in which the displayed area is at least partially covered on the video interface.

Figure 18:
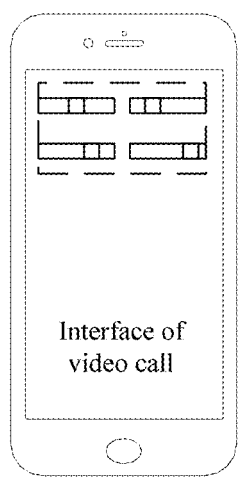
FIG. 18 is a schematic view showing a third specific detail of the sidebar interaction method according to the eighth embodiment of the present disclosure.

In the present embodiment, after the touch operation is detected, the touch operation can be responded, such as outputting vibration feedback, and a corresponding function can be initiated. A function icon corresponding to the function can be further displayed on the interface of the video call, and the displayed area is at least partially covered by the video interface. For example, if the first touch operation corresponding to the button for auxiliary function is detected, an index setting menu of the auxiliary function can be displayed on the current interface of the video call. The first touch may be click touch, press touch, and/or slide touch. Optionally, if click touch corresponding to the button for auxiliary function is detected, or press touch corresponding to the button for auxiliary function is detected, or slide touch corresponding to the button for auxiliary function is detected, an index setting menu of the auxiliary function can be displayed on the current interface of the video call. Further, The index setting menu of the auxiliary function includes a submenu for setting whitening index, a submenu for setting peeling index, a submenu for setting lip color index, and/or a submenu for setting brightness index. As can be seen in FIG. 18, after it is detected the first touch operation corresponding to the button for auxiliary function, the index setting menu of the auxiliary function can be displayed under the interface of the video call. Specifically, it may include the submenu for setting whitening index, the submenu for setting peeling index, and the submenu for setting lip color index, and/or the submenu for setting light index. The current whitening index, the peeling index, the lip color index and/or the light index are displayed at the same time when a full display is shown. The beautification index can be then set based on the index setting menu of the auxiliary function. It is detected the touch operation corresponding to the index setting menu of the auxiliary function, the beautification index can be set based on the touch operation. It is detected of the touch operation at a corresponding touch position, and index parameters can be acquired at the touch position. Next, the current beautification index can be adjusted to the beautification index corresponding to the index parameters. The touch operation can be chosen from a click and/or a slide touch operation. The user can click within the beautification index setting area at his will to set the beautification index. The user may optionally press the display position corresponding to the current beautification index and slide from left to right, or from right to left to set the beautification index.

Further, operation S206 may further include:

Operation S2062: after the function corresponding to the auxiliary program icon is executed, adjusting the display content of the video display interface according to the function response.

In this operation, after the function corresponding to the auxiliary program icon is executed, the display content of the video display interface can adjust according to the function response. It should be appreciated that if the second touch operation corresponding to the button for auxiliary function is detected, the video image collected by the current front camera and/or the rear camera can be acquired. Then the image to be beautified corresponding to the video image can be acquired. Optionally, it is detected whether there is a face image in the video image. And if yes, the face image can be determined to be the image to be beautified, and the current beautification index can be acquired. The image to be beautified is subjected to beauty treatment based on the current beautification index to acquire the beauty image and output the displayed beauty image. Optionally, the current beautification index can be determined based on the index setting menu of the auxiliary function. And optionally, the current beautification index can be determined based on the facial expression in the current face image. After the face image is acquired, emotional intensity of facial expressions is recognized in a face image. It should be appreciated that facial expressions can include happy, very happy, super happy, sad, very sad, super sad, etc. Optionally, a mapping relationship is preset between the facial expressions in the face image and the beautification index. Further, the determination of the corresponding facial expressions in the face image can be based on the corresponding the characteristics of eyes, eyebrows, and/or mouth in the face image.

Further, operation S206 may further include:

Operation S2063: in response to that the function is canceled, displaying a content reply on the display interface.

In this operation, when the function is canceled, the interface displays the content reply. The function icon is hidden and undisplayed on the interface.

According to the method provided by the present series of embodiments, the corresponding function is initiated by responding to the touch operation, the function is displayed on the interface of the video call, the displayed area is at least partially covered by the video interface. After the function corresponding to the auxiliary program icon is executed, the display content of the video display interface can be adjusted according to the function response. When the function is canceled, the display content of the interface is restored. Interactions between machine and users are realized in the video call, and the user experience is further improved.

Further, based on the eighth series of embodiments in respect to the sidebar interaction method of the present disclosure, a tenth series of embodiment of the sidebar interaction method is proposed.

Operation S204 may further include:

Operation S2041, in response to a message sending request being received during a video call, acquiring a corresponding message type and a current layout information;

Operation S2042, determining a target layout information according to the message type and the current layout information;

Operation S2043, displaying a message input window according to the target layout information, and adjusting a video call window and/or the sidebar of the video call.

The target layout information can be acquired as follows: when a message sending request is received, the corresponding message type and current layout information can be acquired. The corresponding target layout information can then be determined according to the message type and the current layout information. The message type may include, but is not limited to, text messages, picture messages, file messages, etc. The message type may determine the type of message input window. For example, when the message type is text messages, the corresponding message input window may be a keyboard window. When the message type is picture message, the corresponding message input window can be a picture selection window, which can display the latest pictures in the album. The current layout information may include, but is not limited to, the size information and location information of the current video input window, and the size information and location information of the current sidebar of the video call. The target layout information may include at least: size information and location information of the message input window, and may include at least one of: zoom information or location information of the video call window, zoom information, location information or function display information of the sidebar of the video call.

It should be definitely appreciated that, in a specific practice, information such as the current display state (horizontal/vertical screen state) and holding state of the mobile terminal can also be acquired, in addition to acquiring the message type and current layout information to determine the target layout information. Such acquisition may comprehensively determine the target layout information. The target layout information can be determined based on the message type, current layout information and current display state. And the target layout information can also be determined based on the message type, current layout information, current display state and holding state.

Further, before operation S2041, the method may further include:

Operation A, acquiring a number of calling parties in the video call and acquiring a current display state of the mobile terminal;

Operation B, determining a corresponding display mode according to the number of calling parties and the current display state;

Operation C, displaying the video call window and the sidebar of the video call according to the display mode.

The embodiments of the present disclosure can be executed by a mobile terminal device with video function. It may be a smart phone, a tablet computer, a portable computer, etc. For convenience, smart phone is taken as an example for the following description.

In the present embodiment, the user can initiate a request for a video call through the video call related application in the mobile phone. When the mobile phone terminal receives the video call request, it can acquire the number of calling parties of the video call and the current display state of the mobile terminal. The number of calling parties is the number of users participating in the video call, and the current display state is whether the mobile terminal is currently displayed horizontally or vertically.

Figure 19:
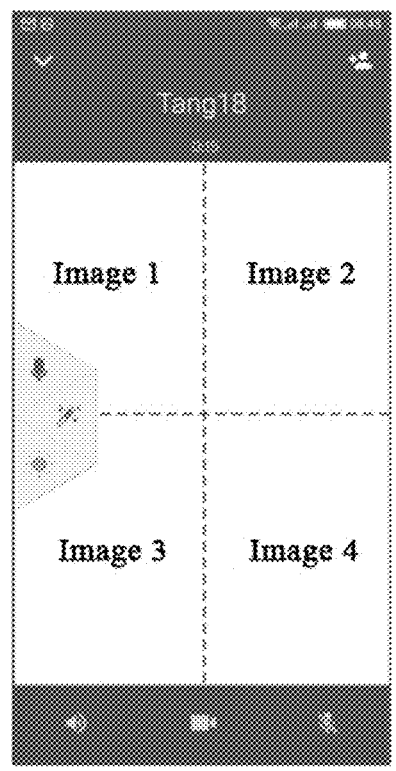
FIG. 19 is a schematic view showing a specific detail of a sidebar interaction method according to a tenth embodiment of the present disclosure.

Then, according to the number of calling parties and the current display state, the corresponding display mode is determined. The video calling window and the sidebar of the video call can thus be displayed according to the display mode. Specifically, the mapping relationship between the number of different calling parties and the corresponding display mode and the mapping relationship between display state and the corresponding display mode can be preset. The corresponding display mode can be determined according to the preset mapping relationship, the number of calling parties and the current display state. The video call display window is used to display the user's head portrait participating in the video call, and its display modes may include but are not limited to: separate display of windows and picture-in-picture display (the image window of the user is reduced and fixedly superimposed at the corner of the other party's window). Of course, there are different arrangement (display mode) for different number of calling parties and current display state. The sidebar of the video call is used to display some functions, such as beautification, voice switching, mute, screenshot, message sending, picture/file addition and other basic shortcut functions, which are usually displayed on a side of the mobile terminal screen, including left, right, above or below. It should be appreciated that the video call may have one or more sidebars, which can be respectively displayed on different sides of the mobile terminal. FIG. 19, shows a display mode of a video call window and a sidebar during a video call.

During a video call, when a user wants to send a text message, a picture or a file, a corresponding message sending request can be triggered. And corresponding target layout information can be acquired.

After acquiring the target layout information, a message input window can be displayed according to the target layout information, and a video call window and/or a sidebar of the video call can be adjusted. The target layout information may include at least: size information and location information of the message input window, and may include at least one of: zoom information or location information of the video call window, zoom information, location information or function display information of the sidebar of the video call. The function display information of the sidebar is the function that the sidebar of the video call needs to display. When the layout is adjusted, the message input window can be displayed according to the size information and location information of the message input window. The video call window and/or the sidebar of the video call can be adjusted according to other information.

As a method for adjusting the layout, the target layout information may at least include: the size information and location information of the message input window, and also the location information of the sidebar of the video call. As such, after the message input window is displayed according to the size information and location information of the message input window, the video function sidebar can be moved to other positions or hidden according to the location information of the video function sidebar without changing the size and position of the video call window. For example, when the screen of the mobile terminal is horizontally placed (the longer side is placed horizontally), the message input window can be directly displayed in the lower right area without changing the size and position of the video call window, and the sidebar can be moved to the lower left area for display. Of course, the location information can be hidden, to hide the sidebar of the video call. It can be hidden visually or leave a icon for being displayed again when the user clicks the icon.

As another method for adjusting the layout, the target layout information may include at least: size information and location information of the message input window, and may include at least one of: zoom information and location information of the video call window, zoom information, and function information of the sidebar of the video call. As such, after the message input window is displayed according to the size information and the location information, the size and the position of the video call window can be adjusted according to the zoom information and the location information of the video call window. And the size and the functions displayed of the sidebar can be adjusted according to the zoom information and the function information of the sidebar.

Figure 20:
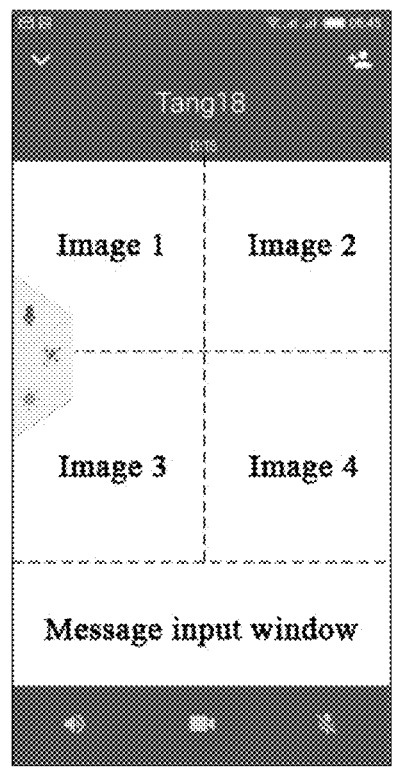
FIG. 20 is a schematic view showing another specific detail of the sidebar interaction method according to the tenth embodiment of the present disclosure.

As another method for adjusting the layout, the target layout information may include at least: size information and location information of the message input window, and may include at least one of: zoom information and location information of the video call window, zoom information, and location information of the sidebar of the video call. As such, after the message input window is displayed according to the size information and the location information, the size and the position of the video call window can be adjusted according to the zoom information and the location information of the video call window. And the size and location of the sidebar can be adjusted according to the zoom information and the location information of the sidebar. When the mobile terminal is in the layout shown in FIG. 3, and if a message sending request is received, the message input window (as shown in the lower part of FIG. 4) can be displayed according to the size information and location information of the message input window. Then, the size and position of the video call window can be adjusted according to the zoom information and location information of the sidebar of the video call. The size and position of the sidebar of the video call can further be adjusted according to the zoom information and location information of the sidebar. The final layout is shown in FIG. 20. By adjusting the size and position of the video call window and/or the sidebar of the video call, there is no overlapping relationship between the message input window and each video call window, or between the message input window and the sidebar of the video call. No video call window would be blocked, and user's experience in videoing would not be affected.

Of course, it should be appreciated that a specific implementation in real practice should not limited to the three layout adjustment methods in the series of embodiments described above, but can also be displayed and adjusted based on specific target layout information.

Further, the sidebar interaction method may further include the following steps:

reducing the transparency of the display message input window and/or the sidebar of the video call.

In some embodiment, while the video call window and/or the sidebar of the video call is adjusted, the message input window and/or the sidebar of the video call can be further prevented from blocking the video call display interface by reducing the transparency of the display message input window and/or the sidebar, thereby further improving the user's experience in the video call.

Regarding the present embodiment, corresponding target layout information can be acquired, when a message sending request is received in a video call. The message input window can be displayed according to the target layout information, and the video call window and/or the sidebar of the video call can be adjusted. As such, when a user needs to send a message in a video call, the target layout information can be acquired, and then the video call display interface can be arranged according to the target layout information. The message input window can be displayed, and the video call window and/or the sidebar of the video call can be adjusted. The message input window and the sidebar of the video call are thus prevented from blocking the video call window, or such operation may reduce inconvenient experience of user induced by the message input window and the sidebar of the video call. The interaction in a video call can be enhanced.

Further, based on the tenth series of embodiments in respect to the sidebar interaction method of the present disclosure, an eleventh series of embodiment of the sidebar interaction method is proposed.

After operation S2042, the method may further include:

Operation S20421, acquiring a message to be sent, in response to an input of the message being complete.

In the present embodiment, when it is detected that the message input is completed, and when the user input is completed, the message to be sent can be acquired.

Operation S20422, hiding the message input window, restoring a current layout of the video call window and/or the sidebar of the video call to a layout before the adjustment, and displaying the message to be sent in the sidebar of the video call;

The message input window can be hidden, and a current layout of the video call window and/or the sidebar of the video call can be restored to a layout before the adjustment. The message to be sent can be displayed in the sidebar of the video call; Restoring the video call window and sidebar of the video call to the layout state before adjustment, means restoring the video call window and sidebar of the video call into the original size and position before adjustment. When the message input is completed, the video call window and the sidebar of the video call can be restored to the layout state before adjustment and to a state excluding the message input window. The message input window can be thus prevented from occupying the video call display interface or blocking the video call display interface.

Operation S20423, in response to a message sending instruction, sending the message to be sent and restoring the sidebar of the video call to a normal state.

When he message sending instruction is received, the message to be sent can be sent and the sidebar of the video call can be restored to a normal state. The normal state is the default display of the sidebar of the video call (including the default size, position and display information).

Of course, it should be appreciated that in the specific implementation, when the completion of message input is detected, the message input window can also be converted into a message display window. And then the message to be sent can be displayed in the message display window. Further, when a message transmission instruction is received, the message can be sent, and the video call window and the sidebar of the video call can be restored to the layout state before adjustment.

After operation S2042, the method may further include:

in response to change information of a display layout of the mobile terminal being detected, correspondingly adjusting the display layout of the mobile terminal according to the change information;

In the present embodiment, when the user rotates the mobile phone during the video call, and if the screen of the mobile phone is changed from the horizontal placement to the vertical placement or the screen is changed from the vertical placement to the horizontal placement, the layout of the mobile phone can be adjusted correspondingly so as to facilitate the video call by the user. In response to change information of a display layout of the mobile terminal being detected, the display layout of the mobile terminal can be specifically and correspondingly adjusted according to the change. The specific adjustment can be as follows: the display after adjustment can be acquired according to the change information, to acquire the current layout information. And further new layout information can be determined according to the display after adjustment and the current layout information. The layout of the mobile terminal can be correspondingly adjusted according to the new layout information.

After operation S2042, the method may further include:

in response to a function operation instruction triggered based on the sidebar of the video call being received, determining a function operating interface according to the function operation instruction, and superposing and displaying the function operating interface and the message input window.

After operation S2042, the method may further include:

in response to an instruction to split a message input window, splitting the message input window into at least a first sub-window and a second sub-window, and respectively displaying the first sub-window and the second sub-window at positions not interfering the video call window and/or the sidebar of the video call.

In the present embodiment, a split button can be further set in the message input window. The user can split the message input window by clicking this button. When the mobile terminal receives the split instruction of the message input window, the message input window can be specifically split into at least a first sub-window and a second sub-window. They can be respectively displayed at positions not interfering the video call window and/or the sidebar of the video call. The number of sub-windows displayed can be determined based on the layout information of the mobile terminal.

In the present embodiment, the user can trigger the corresponding function operation instruction by clicking on a function icon of the sidebar of the video call, such as the function with beautification. At this time, when receiving the function operation instruction triggered based on the sidebar of the video call, the mobile terminal can first determine the function operating interface according to the function operation instruction, and then superimpose the function operating interface and the message input window for display, thus facilitating the user to use other functions while not affecting the user's video call experience.

Further, based on the tenth series of embodiments in respect to the sidebar interaction method of the present disclosure, a twelfth series of embodiment of the sidebar interaction method is proposed.

In the present embodiment, the operation of "displaying a message input window according to the target layout information" may include:

Operation b1, in response to the screen of the mobile terminal being horizontally placed and displayed, and a left display area of the video call window is larger than a right display area, displaying a message input window in the left display area according to the target layout information; and/or, Operation b2, in response to the screen of the mobile terminal being horizontally placed and displayed, and a left display area of the video call window is smaller than a right display area, displaying a message input window in the right display area according to the target layout information.

In the present embodiment, when the target layout information is determined based on the message type, the current layout information and the current display state, and when the message input window is displayed according to the target layout information, as an embodiment, when the screen of the mobile terminal is currently placed horizontally and when the left display area of the video call window is larger than the right display area, the message input window can be displayed in the left display area of the video call window according to the target layout information. As another embodiment, when the screen of the mobile terminal is placed horizontally and the left display area of the video call window is less than or equal to the right display area, a message input window can be displayed on the right display area of the video call window according to the target layout information.

As such, the message input window is selected to be displayed on the side with a larger blank area of the screen of the mobile terminal, so that the message input window can be prevented from blocking the video call window as much as possible. The user can be prevented from being interfered in the video call, and the user interaction experience of the user in the video scene can be enhanced.

In some embodiment, the operation of "displaying the message input window according to the target layout information" may further include:

Operation b3, in response to the screen of the mobile terminal being horizontally placed and displayed, and the mobile terminal is held by a left hand of a user, displaying a message input window in the right display area according to the target layout information;

Operation b4, in response to the screen of the mobile terminal being horizontally placed and displayed, and the mobile terminal is held by a right hand of a user, displaying a message input window in the left display area according to the target layout information;

Operation b5, in response to the screen of the mobile terminal being horizontally placed and displayed, and the mobile terminal is held by a right hand of a user, displaying a message input window in the left display area according to the target layout information.

In the present embodiment, when the target layout information is determined based on the message type, the current layout information, the current display state and the holding state, and when the message input window is displayed according to the target layout information, as an embodiment, when the screen of the mobile terminal is placed horizontally with a left hand, the message input window can be superimposed and displayed on the right side of the video call window according to the target layout information, so as to prevent the message input window from being blocked by the hand when the user holds the terminal with the left hand. And it further facilitates the user to input in the right-sided message input window with his right hand.

As another embodiment, when screen of the mobile terminal is placed horizontally with a right hand, a message input window can be superimposed and displayed on the left side of the video call window according to the target layout information, so that the message input window can be prevented from being blocked by the right hand which holds the terminal. The user can input in the message input window on the left side with the left hand conveniently.

As another embodiment, in response to the screen of the mobile terminal being horizontally placed and displayed, and the mobile terminal is held by both left and right hands of a user, a message input window can be displayed in the left display area or the right display area according to the target layout information. Of course, the message input window can also be displayed on the corresponding side according to the user's input habits.

As such, the side to display the message input window can be determined and displayed according to the current display state and holding side. The message input window can be prevented at most from blocking by the holding hands. User input is facilitated, and user interaction in a videoing experience can be enhanced.

It should be appreciated that in this document, the terms "comprising" "including" or any other variation thereof are intended to cover a non-exclusive inclusion, such that a process, method, article, or system that includes a list of elements includes not only those elements but also other elements not expressly listed, or elements inherent to such process, method, article, or system. Without further restrictions, an element defined by the statement "includes an" does not exclude the presence of another identical element in a process, method, article, or system including the element.

The aforementioned serial numbers regarding the embodiments of the disclosure are for description only and do not represent the superiority and inferiority of the embodiments.

From the above description of the embodiments, those skilled in the art can clearly understand that the method of the above embodiments can be implemented by means of software plus necessary general-purpose hardware platforms. Of course, it can also be implemented by means of hardware, but in many cases the former is a better embodiment. Based on this understanding, the technical solution of the disclosure can be embodied in the form of a software product, which is stored in a storage medium (such as ROM/RAM, magnetic disk, optical disk) as described above, and includes several instructions to cause a terminal device (which can be a mobile phone, a computer, a tablet, an e-reader, or a network device, etc.) to perform the instructions described in various embodiments of the disclosure.

The above is only the preferred embodiment of the disclosure and is not therefore limiting the scope of the disclosure. Any equivalent structure or process change made by using the contents of the present specification and drawings, or directly or indirectly applied in other related technical fields, shall be included in the protection scope of the disclosure.

What is claimed is:

1. A sidebar interaction method, comprising:
receiving an instruction to initiate an interaction, generating an interaction module on a currently operating interface of a front-end application, and outputting at least one notification message in the interaction module;
initiating a back-end application, and displaying a sidebar in a first target display area on the currently operating interface; and detecting a preset operation corresponding to the sidebar and responding to the preset operation,
wherein the operation of outputting at least one notification message in the interaction module comprises:
receiving the at least one notification message, and adding the at least one notification message into the interaction module; and
receiving an instruction to check the at least one notification message, and outputting the at least one notification message from the interaction module,
wherein the operation of receiving an instruction to check the at least one notification message, and outputting the at least one notification message from the interaction module comprises:
receiving the instruction to check the at least one notification message, and in response to a determination that the interaction module includes at least two notification messages, judging whether the at least two notification messages are originated from the front-end application;
in response to that all the notification messages are originated from the front-end application, alternately displaying the notification messages; and
in response to that at least one of the notification messages is not originated from the front-end application, adding an identifier regarding a source application of the notification message onto each of the notification messages, and outputting the notification messages.

2. The method according to claim 1, wherein after the operation of receiving an instruction to initiate an interaction, generating an interaction module on a currently operating interface of a front-end application, and outputting at least one notification message in the interaction module, the method further comprises at least one of:
in response to receiving an instruction to add a first function of a first application, outputting a first function set of the front-end application and adding the first function from the first function set to the interaction module;
in response to receiving an instruction to delete a second function of a second application, outputting a second function set existed in the interaction module, and deleting the second function from the second function set in the interaction module; or
in response to receiving an instruction to switch to a third function of a third application, outputting functions stored in the interaction module, and acquiring the third function from the output functions, and switching the currently operating interface to an interface corresponding to the third function of the third application.

3. The method according to claim 1, wherein the operation of outputting at least one notification message in the interaction module, comprises at least one of:
outputting a floating window associated with the interaction module, and outputting the at least one notification message to the floating window for a user to view and/or reply to the at least one notification message;
in response to the at least one notification message being in a text format, converting the text format into a voice format for output; or
acquiring a quantity of the at least one notification message, and outputting and displaying the at least one notification message in a banner in response to the quantity being more than a preset threshold value.

4. The method according to claim 1, wherein the operation of displaying a sidebar in a first target display area on the currently operating interface, comprises:

acquiring usage information corresponding to the currently operating interface;
determining a blank area based on a display content on the currently operating interface, and determining the first target display area based on the blank display area and the usage information; and
displaying the sidebar corresponding to the usage information in the first target display area.

5. The method according to claim 4, wherein the operation of determining the first target display area based on the blank display area and the usage information, comprises:
in response to the blank display area having a first display area with an area greater than an area required for the usage information in the blank display area, taking the first display area as the first target display area;
and/or
in response to the blank display area not having a first display area with an area greater than an area required for the usage information in the blank display area, determining a second display area having a largest area in the blank display area;
determining at least one target function icon displayed on the sidebar based on the second display area; and
displaying the at least one target function icon in the first target display area.

6. The method according to claim 4, wherein
the method is applied in a terminal, a screen of the terminal is foldable, and the terminal comprises a display interface including a first display interface and a second display interface, or
a screen of the terminal is splittable into a first display interface and a second display interface, and wherein
the operation of determining the first target display area based on the blank display area and the usage information, comprises at least one of:
determining the first target display area based on a position connecting the first display interface and the second display interface;
determining the first target display area based on display contents of the first display interface and/or the second display interface; or
determining the first target display area based on the usage information of the first display interface and/or the second display interface.

7. The method according to claim 6, wherein a quantity and/or a position of the at least one target function icon displayed on the sidebar is determined by at least one of:
determining a number of the at least one target function icon displayed in the second display area based on an area of the second display area;
determining the quantity and/or the position of the at least one target function icon, based on the quantity of the at least one target function icon, at least one application displayed on the display interface and the application to which each function icon in the usage information belongs;
determining the display quantity and/or the position of the at least one target function icon based on display contents of the first display interface and/or the second display interface; or
determining the display quantity and/or the position of the target function icons based on the usage information of the first display interface and/or the second display interface.

8. The method according to claim 4, wherein after the operation of displaying a sidebar corresponding to the usage information in the first target display area, the method further comprises:
   in response to a determination that unread messages regarding an application associated with a display interface is detected and a number of the unread messages is no less than a preset value, determining whether a sub-function icon corresponding to the unread messages exists in the sidebar; and
   in response to sub-function icon corresponding to the unread messages being existed in the sidebar, displaying the sub-function icon.

9. The method according to claim 4, wherein after the operation of displaying a sidebar corresponding to the usage information in the first target display area, the method further comprises:
   in response to a movement operation being detected and triggered to the sidebar, acquiring a touch endpoint corresponding to the movement operation; and
   displaying the sidebar in a display area corresponding to the touch endpoint.

10. The method according to claim 4, wherein the method is applied in a terminal, a screen of the terminal is foldable, and a display interface of the terminal comprises a plurality of display interfaces formed by the foldable screen, or,
   a screen of the terminal is splittable and form a plurality of display interfaces, and wherein the method comprises:
      in response to the display interface being detected and switched to be horizontally placed, determining a second target display area according to the usage information; and
      displaying the sidebar in the second target display area.

11. The method according to claim 4, wherein the operation of displaying the sidebar corresponding to the usage information in the first target display area, comprises:
   in response to at least two applications displayed being detected, determining whether the applications meet preset conditions; and
   in response to the preset conditions being met, displaying the sidebar corresponding to the usage information in the first target display area.

12. The method according to claim 11, wherein the operation of in response to at least two applications displayed being detected, determining whether the applications meet preset conditions, comprises at least one of:
   determining whether the applications are consistent in category attribute, and determining that the applications meet the preset conditions in response to the determination that the applications are consistent in category attribute;
   determining whether display contents of the applications are consistent in format, determining that the applications meet the preset conditions in response to the determination that the display contents of the applications are consistent in format;
   determining whether a number of currently displayed applications to be no more than a preset value, determining that the applications meet the preset conditions in response to the determination that the number of currently displayed applications is no more than a preset value;
   determining areas of display interfaces of the applications to be larger than a preset area, determining that the applications meet preset conditions in response to the determination that a sum of the areas of display interfaces of the applications are larger than a preset area; or
   determining positions of display interfaces of the applications to be at preset positions, determining that the applications meet preset conditions in response to the determination that positions of display interfaces of the applications are at preset positions.

13. The method according to claim 11, wherein the method further comprises:
   stop displaying the sidebar, in response to whether the sidebar meets conditions being determined, and wherein the conditions comprises at least one of:
      determining a first category attribute of each of the applications, and in response to a number of attributes in a same category being no more than a preset value, determining that the sidebar meets the condition;
      determining display contents of the applications, and if the display contents fail to be in a same format, determining that the sidebar meets the condition;
      determining a first number of the applications currently displayed, and if the first number is more than a preset value, determining that the sidebar meets the condition;
      determining areas of display interfaces of the applications, and if the areas are no more than a preset value, determining that the sidebar meets the condition;
      determining positions of display interfaces of the applications, and if the positions fail to be in a first preset layout, determining that the sidebar meets the condition;
      determining a second category attribute of non-operating applications, and if the non-operating applications are consistent in the second category attributes, determining that the sidebar meets the condition;
      determining that whether a layout of the non-operating applications meets a second preset layout, and if so, determining that the sidebar meets the condition; or
      determining a second number of the non-operating applications, and in response to a proportion of the second number to the first number reaching no less than a preset value, determining that the sidebar meets the condition.

14. The method according to claim 11, wherein after the operation in response to the preset conditions being met, displaying a sidebar corresponding to the usage information in the first target display area, the method further comprises:
   in response to an execution instruction regarding the sidebar being detected, determining at least one target application corresponding to the execution instruction, wherein the at least one target application comprises one or more applications; and
   executing a function corresponding to the execution instruction, regarding the at least one target application.

15. The method according to claim 11, wherein after the operation in response to the preset conditions being met, displaying a sidebar corresponding to the usage information in the first target display area, the method further comprises:
   in response to a switching instruction regarding the applications being detected, switching and displaying a target application corresponding to the switching instruction, and adjusting the sidebar based on the target application.

16. The method according to claim 11, wherein the method further comprises:
   in response to the preset conditions being met, determining a mode to display the sidebar;

displaying the sidebar according to the mode; and
in response to at least two applications being displayed, adjusting a position of a function item of the sidebar and/or the sidebar based on the at least two applications.

17. The method according to claim 1, wherein the preset operation comprises a preset touch to the sidebar, and the operation of detecting a preset operation corresponding to the sidebar and responding to the preset operation, comprises:
detecting the preset touch to the sidebar and displaying the sidebar, wherein the sidebar comprises at least one of: a setting button, a shortcut button for function and/or a shortcut button for application.

18. The method according to claim 17, wherein after the operation of displaying the sidebar, the method further comprises at least one of:
detecting a first preset touch operation to the setting button, displaying a sidebar editing center, wherein the sidebar editing center comprises an editing center of the shortcut button for function and/or an editing center of the shortcut button for application;
editing the sidebar based on a touch operation regarding the sidebar editing center; or
detecting a second preset touch operation regarding the shortcut button for function, displaying an editing center of the shortcut button for function and/or an editing center of the shortcut button for application;
editing the sidebar based on a touch operation to the editing center of the shortcut button for function.

19. The method according to claim 1, wherein the back-end application comprises a video call, and the operation of initiating a back-end application, and displaying a sidebar in the first target display area on the currently operating interface, comprises:
in response to an instruction to initiate the video call being detected, displaying an interface of the video call, and displaying a sidebar for an auxiliary application on the interface of the video call.

20. The method according to claim 19, wherein after the operation of displaying an interface of the video call, and displaying a sidebar for an auxiliary application on the interface of the video call, the method further comprises:
hiding the sidebar for auxiliary application and displaying at least one auxiliary program icon on the interface of the video call; and
executing a touch operation to the auxiliary program icon and responding to the touch operation.

21. The method according to claim 20, wherein
a button for auxiliary application is configured to correspond to the auxiliary program icon, wherein the button for auxiliary program comprises a button for auxiliary function;
after the operation of hiding the sidebar for auxiliary application and displaying the at least one auxiliary program icon on the interface of the video call, the method further comprises:
judging whether a touch operation to the button for auxiliary function is detected;
in response to the touch operation to the button for auxiliary function being detected, increasing a color depth of the button for auxiliary function, and/or reducing transparency of the button for auxiliary function; and
in response to the touch operation to the button for auxiliary function being failed to be detected, reducing a color depth and/or a display area of the button for auxiliary function, and/or increasing transparency of the button for auxiliary function, and/or moving the button for auxiliary function to a sidebar and hiding the button for auxiliary function.

22. The method according to claim 21, wherein after the operation of executing a touch operation to the auxiliary program icon and responding to the touch operation, the method further comprises:
in response to an instruction being detected to close the video call, closing the interface of the video call;
switching off the auxiliary function and hiding the button for auxiliary function.

23. The method according to claim 19, wherein the operation of displaying a sidebar for an auxiliary application on the interface of the video call, comprises:
in response to a message sending request being received during a video call, acquiring a corresponding message type and a current layout information;
determining a target layout information according to the message type and the current layout information;
displaying a message input window according to the target layout information, and adjusting a video call window and/or the sidebar of the video call.

24. The method according to claim 23, wherein the method is applied in a terminal, after the operation of displaying a message input window according to the target layout information, and adjusting a video call window and/or the sidebar of the video call, the method further comprises at least one of:
acquiring a message to be sent, in response to an input of the message being complete; and
hiding the message input window, restoring a current layout of the video call window and/or the sidebar of the video call to a layout before adjustment, and displaying the message to be sent in the sidebar of the video call;
in response to an instruction to send the message, sending the message and restoring the sidebar of the video call to a normal state;
in response to a change in a positioning state of the terminal being detected, correspondingly adjusting a display layout on display interface of the mobile terminal according to the change; or
in response to an instruction being received to trigger an operation to the sidebar of the video call, determining an interface according to the instruction, and superposing and displaying the interface and the message input window.

25. The method according to claim 23, wherein the method is applied in a terminal, prior to the operation of determining a target layout information according to the message type and the current layout information, the method further comprises:
acquiring a number of calling parties in the video call and acquiring a current display state of the terminal;
determining a corresponding display mode according to the number of calling parties and the current display state; and
displaying the video call window and the sidebar of the video call according to the display mode.

26. The method according to claim 23, wherein the method is applied in a terminal, the operation of displaying a message input window according to the target layout information, comprises:
in response to a screen of the terminal being horizontally placed and displayed, and a left display area of the video call window is larger than a right display area, displaying a message input window in the left display area according to the target layout information; and/or, in response to a screen of the mobile terminal being horizontally placed and displayed, and a left display area of the video call window is smaller than or equal to a right display area, displaying a message input window in the right display area according to the target layout information.

27. The method according to claim 23, wherein the method is applied in a terminal, the operation of displaying a message input window according to the target layout information, comprises at least one of:

in response to a screen of the terminal being horizontally placed and displayed, and the terminal is held by a left hand of a user, displaying a message input window in a right display area according to the target layout information;

in response to a screen of the terminal being horizontally placed and displayed, and the terminal is held by a right hand of a user, displaying a message input window in a left display area according to the target layout information; or in response to a screen of the terminal being horizontally placed and displayed, and the terminal is held by both left and right hands of a user, displaying a message input window in a left display area or a right display area according to the target layout information.

28. A sidebar interaction device, comprising a processor, and a memory storing one or more programs including instructions that, when executed by the processor, cause the device to perform the operations as recited in claim 1.

29. A non-transitory computer readable storage medium storing computer program code instructions that, when executed by a processor of a computing device, cause the computing device to perform the operations as recited in claim 1.

* * * * *